United States Patent
Machida et al.

(10) Patent No.: US 9,881,056 B2
(45) Date of Patent: Jan. 30, 2018

(54) MONITOR SYSTEM AND MONITOR PROGRAM

(71) Applicant: Hitachi, Ltd., Tokyo (JP)

(72) Inventors: Takayuki Machida, Tokyo (JP); Takaki Kuroda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 411 days.

(21) Appl. No.: 14/427,997

(22) PCT Filed: Oct. 31, 2012

(86) PCT No.: PCT/JP2012/078185
§ 371 (c)(1),
(2) Date: Mar. 13, 2015

(87) PCT Pub. No.: WO2014/068705
PCT Pub. Date: May 8, 2014

(65) Prior Publication Data
US 2015/0248460 A1 Sep. 3, 2015

(51) Int. Cl.
*G06F 7/00* (2006.01)
*G06F 17/30* (2006.01)
*G06F 11/30* (2006.01)
*G06F 11/07* (2006.01)

(52) U.S. Cl.
CPC .... *G06F 17/30507* (2013.01); *G06F 11/0709* (2013.01); *G06F 11/079* (2013.01); *G06F 11/3055* (2013.01); *G06F 17/30088* (2013.01); *G06F 11/3072* (2013.01); *G06F 2201/86* (2013.01)

(58) Field of Classification Search
None
See application file for complete search history.

(56) References Cited

U.S. PATENT DOCUMENTS

2009/0313198 A1 12/2009 Kudo et al.
2014/0025808 A1* 1/2014 Ito ......................... H04L 43/10
                                                          709/224

FOREIGN PATENT DOCUMENTS

| JP | 2011-76409 A | 4/2011 |
| JP | 2011-518359 A | 6/2011 |
| JP | 2012-22614 A | 2/2012 |
| WO | 2009/144969 A2 | 12/2009 |

* cited by examiner

*Primary Examiner* — Thu Nga Nguyen
(74) *Attorney, Agent, or Firm* — Mattingly & Malur, PC

(57) ABSTRACT

A monitor system transmits a request requesting event occurrence information to multiple node apparatuses, detects occurrence of an event on the basis of event occurrence information included in a response, calculates an index value of each of conclusions of multiple rules indicating corresponding relationship between one or more condition events and a conclusion, and generates, at a predetermined time point, a snapshot indicating an index value at that time point. When the monitor system receives a first response in reply to a first request, the monitor system updates the index value indicated by the snapshot generated in a period from a transmission date/time of the first request to a reception date/time of the first response, on the basis of the first response.

15 Claims, 25 Drawing Sheets

| Status management ID 1341 | Node ID 1342 | Node type 1343 | Node name 1344 | Component ID 1345 | Component name 1346 | Event type 1347 | Latest status 1348 | Event reception date/time of latest information collection process 1349 | Latest information collection process start date/time 1340 | Previous status 134a | Previous information collection process start date/time 134b |
|---|---|---|---|---|---|---|---|---|---|---|---|
| 1 | 70 | Server | ServerA | 111 | FileSystemA | FileSystem_Err | Error | 4/13/2008 9:20:11 | 4/13/2008 9:15:11 | Error | 4/13/2008 9:10:11 |
| 2 | 71 | Server | ServerB | 222 | FileSystemB | FileSystem_Err | Error | 4/13/2008 9:20:20 | 4/13/2008 9:15:20 | Normal | 4/13/2008 9:10:20 |
| 3 | 72 | Switch | SwitchC | 223 | Port1 | Port_Down | Normal | 4/13/2008 9:45:25 | 4/13/2008 9:15:25 | — | — |
| 4 | 80 | Storage | Storage1 | 224 | DiskDrive1 | DiskDrive_Err | Error | 4/13/2008 9:40:35 | 4/13/2008 9:15:35 | — | — |
| 5 | 90 | Storage | Storage2 | 330 | LU2 | LU_Err | Error | 4/13/2008 9:28:35 | 4/13/2008 9:22:45 | Normal | 4/13/2008 9:10:35 |

| Node type | Event type | Valid period (minute) |
|---|---|---|
| Server | Cpu_Pfm_Err | 5 |
| Server | iSCSI_Comm_Err | 10 |
| Server | FileSystem_Err | 10 |
| Switch | Port_Down | 10 |
| ... | ... | ... |
| Storage | Controller_Err | 10 |
| Storage | DiskDrive_Err | 10 |
| ... | ... | ... |

1351 — Node type
1352 — Event type
1353 — Valid period (minute)

| Start date/time | Node name | Event type |
|---|---|---|
| 4/13/2008 9:20:11 | ServerA | FileSystem_Err |
| 4/13/2008 9:20:20 | ServerB | FileSystem_Err |
| 4/13/2008 9:40:35 | Storage1 | DiskDrive_Err |
| ... | ... | ... |

1361 — Start date/time
1362 — Node name
1363 — Event type

| Snapshot ID 1371 | Root cause 1372 | Expanded rule 1373 | Status management ID 1374 | Not condition 1375 | Weight 1376 |
|---|---|---|---|---|---|
| 0001 | "Storage1" Disk Drive_Err | Rule2 | 1 | False | 100% |
| 0001 | "Storage1" Disk Drive_Err | Rule2 | 2 | False | 100% |
| 0001 | "Storage1" Disk Drive_Err | Rule2 | 4 | False | — |
| 0001 | "SwitchC" Port_Down | Rule1 | 1 | False | 100% |
| 0001 | "SwitchC" Port_Down | Rule1 | 3 | False | — |
| 0001 | "SwitchC" Port_Down | Rule1 | 2 | False | 100% |
| 0002 | "Storage2" Controller_Err | Rule3 | 5 | False | 50% |
| ... | ... | ... | ... | ... | ... |

| Snapshot ID | Root cause | Expanded rule | Number of condition events | Certainty |
|---|---|---|---|---|
| 0001 | "Storage1" Disk Drive_Err | Rule2 | 3 | 66% |
| 0001 | "SwitchC" Port_Down | Rule1 | 3 | 66% |
| 0002 | "Server9" FCHBA_Err | Rule20 | 2 | 25% |

1381  1382  1383  1384  1385

| Snapshot ID | Root cause | Expanded rule | Number of condition events | Certainty |
|---|---|---|---|---|
| 0001 | "Storage1" Disk Drive_Err | Rule2 | 3 | 100% |
| 0001 | "SwitchC" Port_Down | Rule1 | 3 | 0% |
| 0002 | "Server9" FCHBA_Err | Rule20 | 2 | 25% |

| Snapshot ID | Root cause | Certainty | Date/time of snapshot | Updated date/time |
|---|---|---|---|---|
| 0001 | "Storage1" Disk Drive_Err | 100% | 4/20/2008 9:30:11 | 4/20/2008 9:41:11 |
| 0001 | "SwitchC" Port_Down | 0% | 4/20/2008 9:30:11 | 4/20/2008 9:46:11 |
| 0002 | "Server9" FCHBA_Err | 25% | 4/20/2008 9:40:11 | 4/20/2008 9:40:11 |
| 0003 | "Storage2" Disk Drive_Err | 75% | 4/20/2008 9:50:11 | 4/20/2008 9:50:11 |

| SnapShot | ⟲ Availability Snapshots 2008-4-13 9:30 +0900 | | | |
|---|---|---|---|---|
| ⟲ -2008-4-13 9:30 | Name | Component | Certainly | Event Detected Nodes |
| -#1 Storage1 Disk -#2 SwitchC ... | #1  Storage1 | DiskDrive | 100% | ServerA,ServerB |
| +2008-4-13 9:40 | #2  SwitchC | FCport | 0% | ServerA,ServerB |
| ⟲ +2008-4-13 9:50 | | | | |
| +2008-4-13 10:02 | | | | |
| +2008-4-13 10:20 | | | | |
| | Description | | | |

91 — SnapShot column
92 — Availability Snapshots header
93 — snapshot detail
9 — window

MONITOR SYSTEM AND MONITOR PROGRAM

TECHNICAL FIELD

The present invention relates to a technique for analyzing a root cause of an event that occurred in a node apparatus of a monitor target.

BACKGROUND ART

A monitor system is known that monitors a node apparatus such as a server, a storage, a network apparatus, detects phenomenon (hereinafter referred to as "event") such as failure or status change that has occurred in a node apparatus of a monitor target, and analyzes a root cause of the detected event (for example, see PTL 1).

The monitor system stores multiple rules indicating, for example, corresponding relationship between one or more condition events corresponding to one or more events related to any one of multiple node apparatuses and a conclusion which is a cause in a case where the one or more events occur, and calculates a certainty indicating the certainty that each conclusion is the cause on the basis of presence/absence of detection of the rule and the condition event. For example, a certainty regarding a certain conclusion is a ratio of the number of condition events which are associated with the conclusion and which are detected by the monitor system with respect to the total number of condition events associated with the condition. The monitor system displays a result of the cause analysis including the certainty calculated. The administrator can look up the result of the cause analysis displayed on the monitor system, and can estimate the root cause.

CITATION LIST

Patent Literature

[PTL 1] WO 2009/144969

SUMMARY OF INVENTION

Technical Problem

For example, the monitor system detects occurrence of an event in the node apparatus as follows. With a regular interval of time or irregularly, the monitor system performs polling processing including transmitting, to each node apparatus, a request for requesting event occurrence information indicating whether an event has occurred in the node apparatus or not, and receiving a response in reply to the request. Subsequently, the monitor system detects occurrence of an event related to the node apparatus on the basis of the event occurrence information included in the received response.

As described above, when the monitor system performs the polling processing to detect occurrence of an event, there may be delay in the reception of responses from some of node apparatuses due to, for example, delay of data transfer caused in a communication network, and there may be delay in the detection of an event related to the some of the node apparatuses. For example, in a case where the monitor system performs the cause analysis at a time point (first time point) which is a certain period of time after the detection of the first event, the detection of the event related to some of node apparatuses may be delayed with respect to the first time point. In this case, in the cause analysis at the first time point, the delayed detection of the event is not taken into consideration, and therefore, the result of the cause analysis at the first time point cannot be said to be accurate.

The monitor system may perform the cause analysis at, for example, a time point of the detection of the event that was detected with the delay or a time point after the time point of the detection (second time point). However, in a case where the monitor system performs the cause analysis at the second time point, the following problem occurs if the period from the detection of the first event to the second time point becomes long.

More specifically, usually, a valid period is configured for each event corresponding to a condition event included in a rule. More specifically, with regard to the detected event, from when the event was detected to when the valid period that is configured for the event elapses, the monitor system performs the cause analysis while assuming that the detection of the event is valid. With regard to the event of which valid period has elapsed since the detection, the monitor apparatus performs the cause analysis while assuming the detection of the event is invalid.

Therefore, in a case where the monitor system performs the cause analysis at the second time point, the follow issue may occur. When the period from the detection of the first event to the second time point becomes long, the valid period of, e.g., the event that was first detected has already passed at the second time point, and the detection of the event may have already become invalid. In this case, in the cause analysis at the second time point, the detection of, e.g., the event that was detected first and that has become invalid is not taken into consideration, and therefore, the result of the cause analysis at the second time point cannot be said to be accurate.

By the way, when the valid period of the event is increased, the period in which detections of multiple events are valid may overlap with another a higher degree of possibility even when the multiple events are detected with an interval therebetween. As a result, more accurate certainty may be considered to be obtained.

However, when the valid period of the event is long, the detection of an irrelevant event (for example, an event that occurred due to a previously occurred cause) remains valid. More specifically, this may increase noise, and make it impossible to perform accurate cause analysis on the contrary.

Solution to Problem

A monitor system transmits a request for event occurrence information to multiple node apparatuses, detects occurrence of an event on the basis of the event occurrence information included in a response, calculates an index value of each of conclusions of multiple rules indicating corresponding relationship between one or more condition events and a conclusion, and generates, at a predetermined time point, a snapshot indicating an index value at that time point. When the monitor system receives a first response in reply to a first request, the monitor system updates the index value indicated by the snapshot generated in a period including a period from a transmission date/time of the first request to a reception date/time of the first response, on the basis of the first response. The monitor system includes a storage device, and a storage device unit may store the multiple rules. The storage device unit includes one or more storage devices, and the multiple storage devices may be of the same type or different types.

Advantageous Effects of Invention

Cause analysis of an event that occurs in a node apparatus of a monitor target can be done more accurately.

BRIEF DESCRIPTION OF DRAWINGS

FIG. 6 is a configuration diagram illustrating an example of a status management table according to the embodiment.

FIG. 8 is a configuration diagram illustrating an example of an event valid period configuring table according to the embodiment.

FIG. 9 is a configuration diagram illustrating an example of an event expiration task table according to the embodiment.

FIG. 12A is a diagram illustrating a first example of a condition table according to the embodiment.

FIG. 13A is a diagram illustrating a first example of an expanded rule table according to the embodiment.

FIG. 14B is a diagram illustrating a second example of the snapshot table according to the embodiment.

FIG. 23 is a configuration diagram illustrating an example of a snapshot display screen according to the embodiment.

DESCRIPTION OF EMBODIMENTS

Figure 1:
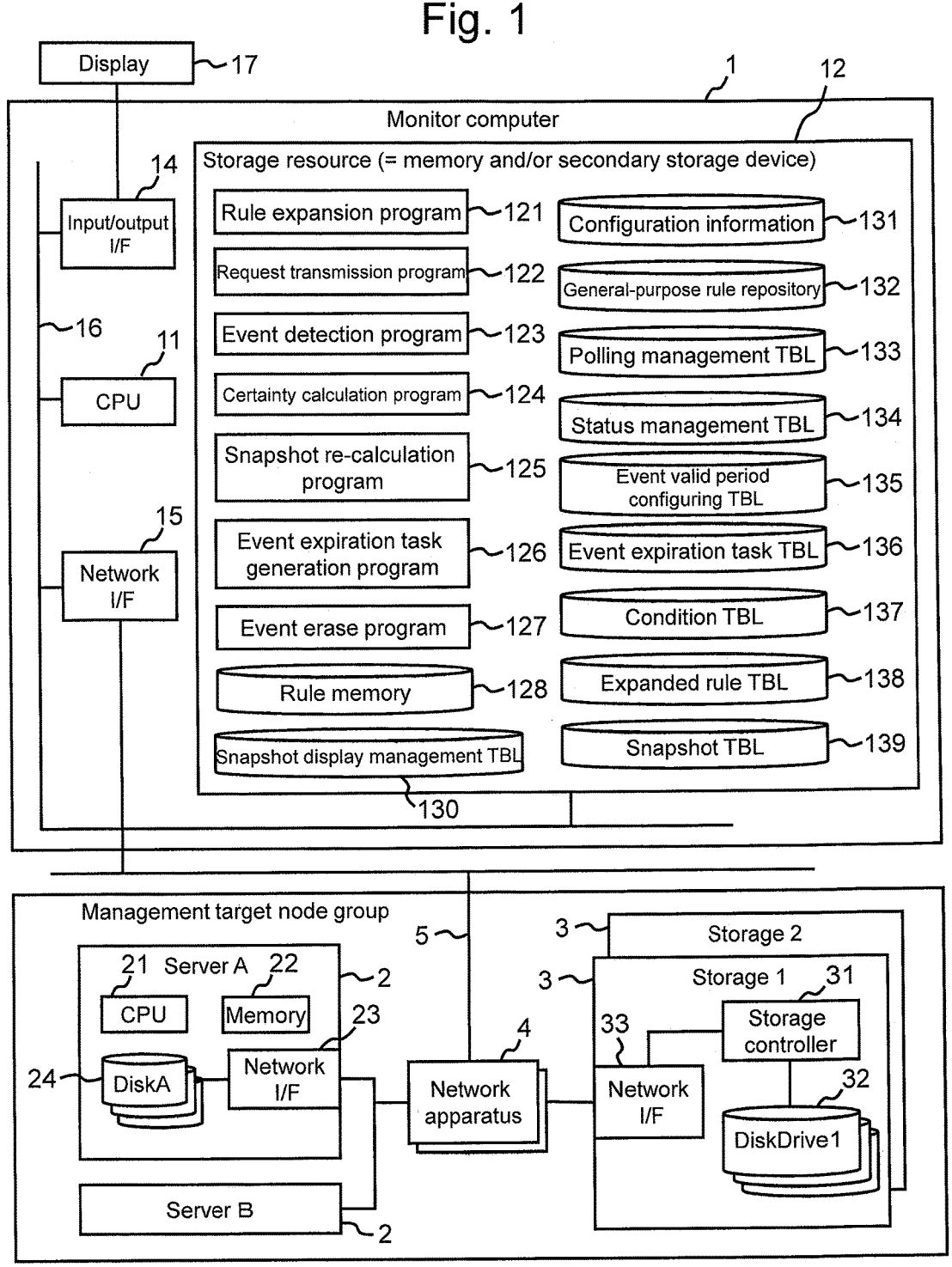
FIG. 1 is a configuration diagram illustrating an example of a computer system according to an embodiment of the present invention.

An embodiment of the present invention will be described with reference to drawings. The embodiment described below is not intended to limit the invention according to the scope of claims, and all of the elements and a combination thereof described in the embodiment are not necessary for the means for achieving the invention. In the drawings, throughout multiple drawings, the same reference numerals denote the same constituent elements.

In the description below, information is described using an expression such as "aaa table", but the information may be expressed other than a data structure such as a table. For this reason, in order to indicate that the data structure is not relied upon, for example, "aaa table" may be called "aaa information".

When the contents of each piece of information are described, expressions such as "identification information", "identifier", "name", and "ID" are used, and they can be replaced with each other.

In the description below, description may be made using a "program" as the subject. As the program is executed by a processor whereby defined processing is performed while using a memory and a communication port (network I/F), description may be made using a processor as the subject. Alternatively, the processing disclosed with description having the program as its subject may also be processing performed by a computer such as a monitor system. All or a part of the program may be achieved with dedicated hardware. Various kinds of programs may be installed to each computer by a program distribution server and a computer-readable storage medium.

Hereinafter, a set of one or more computers that monitor a computer system and show display information may be referred to as a monitor system. In a case where the monitor computer shows display information, the monitor computer is a monitor system. A combination of the monitor computer and the display apparatus is also a monitor system. In order to enhance the speed of processing and improve the reliability of the processing, multiple computers may achieve the processing identical or similar to that of the monitor computer, and in this case, the multiple computers (including an apparatus for display, in a case where the apparatus for display performs displaying) constitute a monitor system. It should be noted that the action of "displaying" that is performed by a computer (alternatively, a control device (for example, processor) possessed by a computer) may be any one of the action of the computer for displaying information on a display device of the computer and the action of transmitting information to be displayed on a display device (display information) to another computer having the display device.

FIG. 1 is a configuration diagram illustrating an example of a computer system according to an embodiment of the present invention.

The computer system includes a monitor computer 1, one or more servers 2, one or more storages 3, one or more network apparatuses 4, and a communication network 5 such as a LAN (Local Area Network). The computer system according to the present embodiment includes two servers 2, which are more specifically, a server 2 of which name is "Server A" (which will be hereinafter denoted as a server "Server A") and a server 2 of which name is "Server B" (which will be hereinafter denoted as a server "Server B").

In addition, the computer system according to the present embodiment includes two storages 3, which are more specifically, a storage 3 of which name is "Storage 1" (which will be hereinafter denoted as storage "Storage 1") and a storage 3 of which name is "Storage 2" (which will be hereinafter denoted as storage "Storage 2"). The network apparatus 4 is an IP (Internet Protocol) switch (which may be hereinafter simply referred to as "switch"), a router, and the like. The monitor computer 1, the server 2, and the storage 3 are coupled to each other via the communication network 5 and the network apparatus 4.

Hereinafter, apparatuses that are included in the computer system (the server 2, the storage 3, the network apparatus 4, and the like) may be referred to as "node apparatuses". The computer system may have, for example, a host computer, an NAS (Network Attached Storage), a file server, a printer, and the like as a node apparatus. A logical or physical constituent object such as a device provided in a node apparatus may be referred to as a "component". Examples of the components include a CPU (Central Processing Unit), a memory, a network I/F (interface), a disk, a program, a volume defined in the storage 3, a RAID (Redundant Arrays of Inexpensive Disks) group, and the like. Hereinafter, a node apparatus which the monitor computer 1 monitors as a target may be referred to as a "monitor target apparatus".

The server 2 is a computer that executes a server program and the like and provides predetermined service to users. The server 2 includes a CPU 21, a memory 22, a network I/F 23, and an iSCSI (Internet Small Computer System Interface) initiator (not shown). An iSCSI disk (which may be hereinafter simply referred to as "disk") 24, which is a virtual volume having a storage area of the storage 3 allocated thereto, is formed in the server 2. The server 2 can use the iSCSI disk 24, via the iSCSI initiator, as if it is a local hard disk. The network I/F 23 is an interface device for connecting to the communication network 5. It should be noted that the server 2 may be a physical server, or may be a virtual server for operating one or more VMs.

The storage 3 is an apparatus for providing a storage area to the server 2 and the like. The storage 3 includes a storage controller 31, a disk drive 32, and a network I/F 33. Instead of the disk drive 32 or in addition to the disk drive 32, the storage 3 may have other types of storage media such as a solid state storage medium and an optical storage medium. The network I/F 33 is an interface device for connecting to the communication network 5. The storage 3 provides, for example, a storage area for forming the iSCSI disk 24 to the server 2.

The monitor computer 1 is a computer for managing the monitor target apparatus. The monitor computer 1 is, for example, a general-purpose computer, and includes a CPU 11, a storage resource 12, an input/output I/F 14, a network I/F 15, and a bus 16. The CPU 11, the storage resource 12, the input/output I/F 14, and the network I/F 15 are coupled to each other via the bus 16. The storage resource 12 may be a memory, or a secondary storage apparatus such as a hard disk drive (HDD), or may be a combination of a memory and a secondary storage apparatus.

The storage resource 12 stores a rule expansion program 121, a request transmission program 122, an event detection program 123, a certainty calculation program 124, a snapshot re-calculation program 125, an event expiration task generation program 126, and an event erase program 127. Various kinds of programs 121 to 127 stored in the storage resource 12 are executed by the CPU 11. Further, the storage resource 12 stores a rule memory 128, configuration information 131, a general rule repository 132, a polling management table (TBL) 133, a status management table 134, an event valid period configuring table 135, an event expiration task table 136, a condition table 137, an expanded rule table 138, a snapshot table 139, and a snapshot display management table 130. The rule memory 128 stores rule memory data used for certainty calculation processing in which a certainty is calculated. The general rule repository 132 stores one or more general rules.

The network I/F 15 is an interface device for connecting to the communication network 5. The input/output I/F 14 is an interface device for connecting to the display 17. The monitor computer 1 causes the display 17 to display a result of cause analysis and other information, thus presenting the result of the cause analysis and the like to the administrator. It should be noted that the monitor computer 1 may have the display 17 provided therein.

With a regular interval of time or irregularly, the monitor computer 1 transmits, to the monitor target apparatus, data (hereinafter referred to as "status request" or simply "request") for inquiring the status of the monitor target apparatus itself or a component thereof, and more specifically, for inquiring whether the monitor target apparatus is operating normally or in abnormal state. The monitor target apparatus having received the status request transmits, to the monitor computer 1, response data (hereinafter referred to as "status response" or simply "response") including information indicating the status of the monitor target apparatus itself or the component thereof (event occurrence information, which may be hereinafter referred to as "status information"). The monitor computer 1 determines whether an event has occurred in the monitor target apparatus or not on the basis of the status response received from the monitor target apparatus. For example, the monitor computer 1 performs various kinds of processing such as processing for analyzing the cause of the event in a case where the status of the monitor target apparatus or the component thereof has changed (certainty calculation processing), and outputs the processing result. In the present embodiment, with a regular interval of time or irregularly, processing for transmitting the status request to the monitor target apparatus and obtaining the status information about the monitor target apparatus or the component thereof from the monitor target apparatus will be referred to as "request transmission processing".

Figure 2:
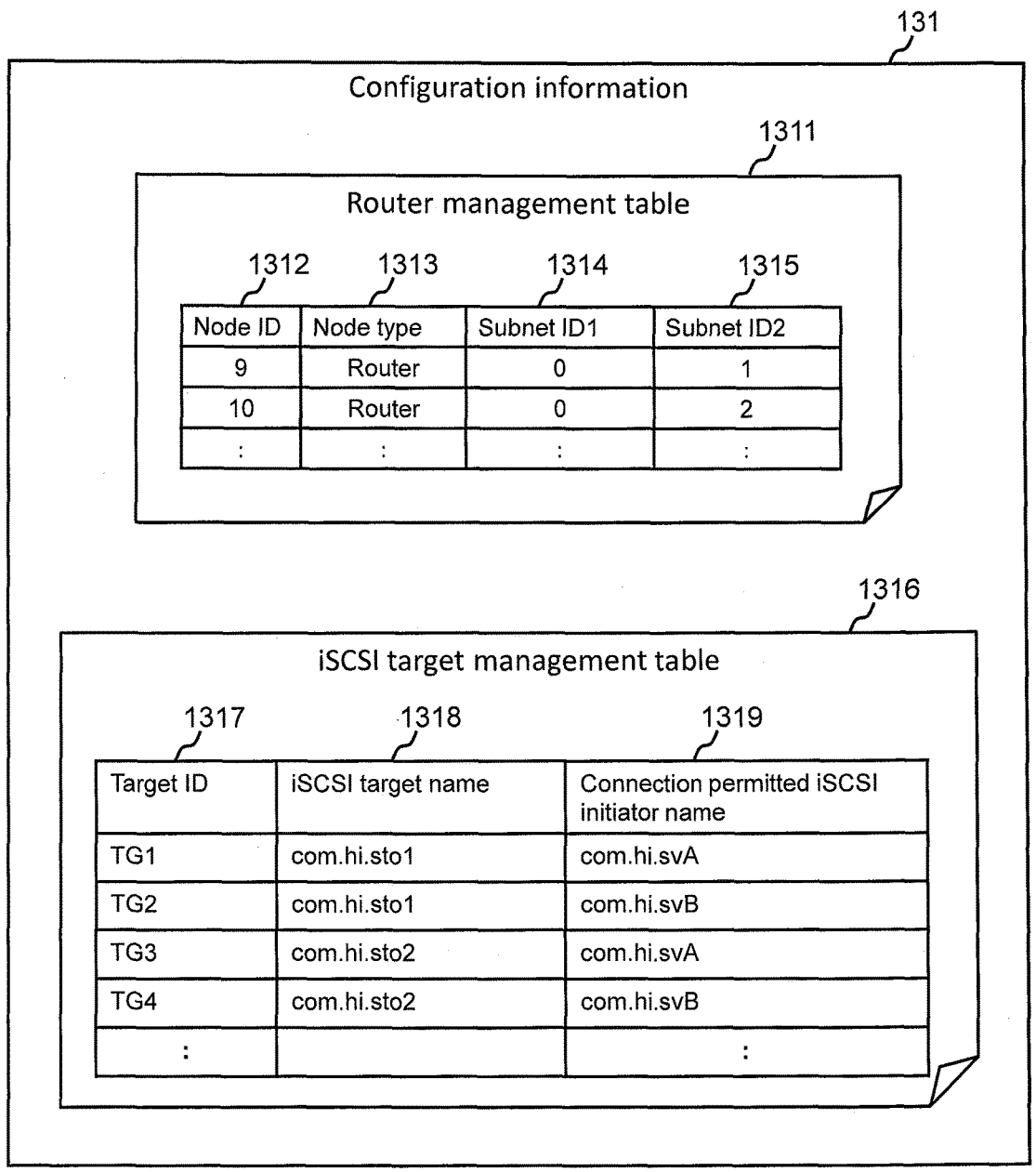
FIG. 2 is a configuration diagram illustrating an example of configuration information according to the embodiment.

FIG. 2 is a configuration diagram illustrating an example of configuration information according to the embodiment.

The configuration information 131 is information indicating the configuration of the computer system. More specifically, the configuration information 131 is information indicating, e.g., what kind of node apparatuses are included in the computer system, how each node apparatus is configured (for example, what kind of component the node apparatus has), what is the connection relationship between node apparatuses or between components, and what is inclusion relationship between a node apparatus and a component. The configuration information 131 includes, for example, a router management table 1311 and an iSCSI target management table 1316.

The router management table 1311 is data for managing a subnet to which the routers are connected, which are examples of the network apparatuses 4 included in the computer system. The router management table 1311 includes fields of a node ID 1312, a node type 1313, a subnet ID1 1314, and a subnet ID2 1315. The identifier of the router is stored to the node ID 1312. Data indicating that the type of the node apparatus is a router, e.g., "Ruter", is stored to the node type 1313. The identifiers of the two subnets connected by the router are stored to the subnet ID1 1314 and subnet ID2 1315, respectively. For example, the first entry from the top of the router management table 1311 of FIG. 2 indicates that the router represented by the identifier "9" connects the subnet of which identifier is "0" and the subnet of which identifier is "1".

The iSCSI target management table 1316 is data for managing the corresponding relationship between an iSCSI target and an iSCSI initiator for which the iSCSI target allows connection. The iSCSI target management table 1316 includes fields of a target ID 1317, an iSCSI target name 1318, and a connection permitted iSCSI initiator name 1319. The target ID 1317 stores an identifier given to each combination of an iSCSI target and an iSCSI initiator for which the iSCSI target allows connection. The iSCSI target name 1318 stores data for identifying the iSCSI target. The connection permitted iSCSI initiator name 1319 stores data for identifying the iSCSI initiator which is permitted to make connection. For example, the first entry from the top of the iSCSI target management table 1316 of FIG. 2 indicates that the storage "Storage 1" which is the iSCSI target (the storage 3 identified by "com.hi.sto1") allows the server "Server A" which is the iSCSI initiator (the server 2 identified by "com.hi.svA") to make connection.

Figure 3:
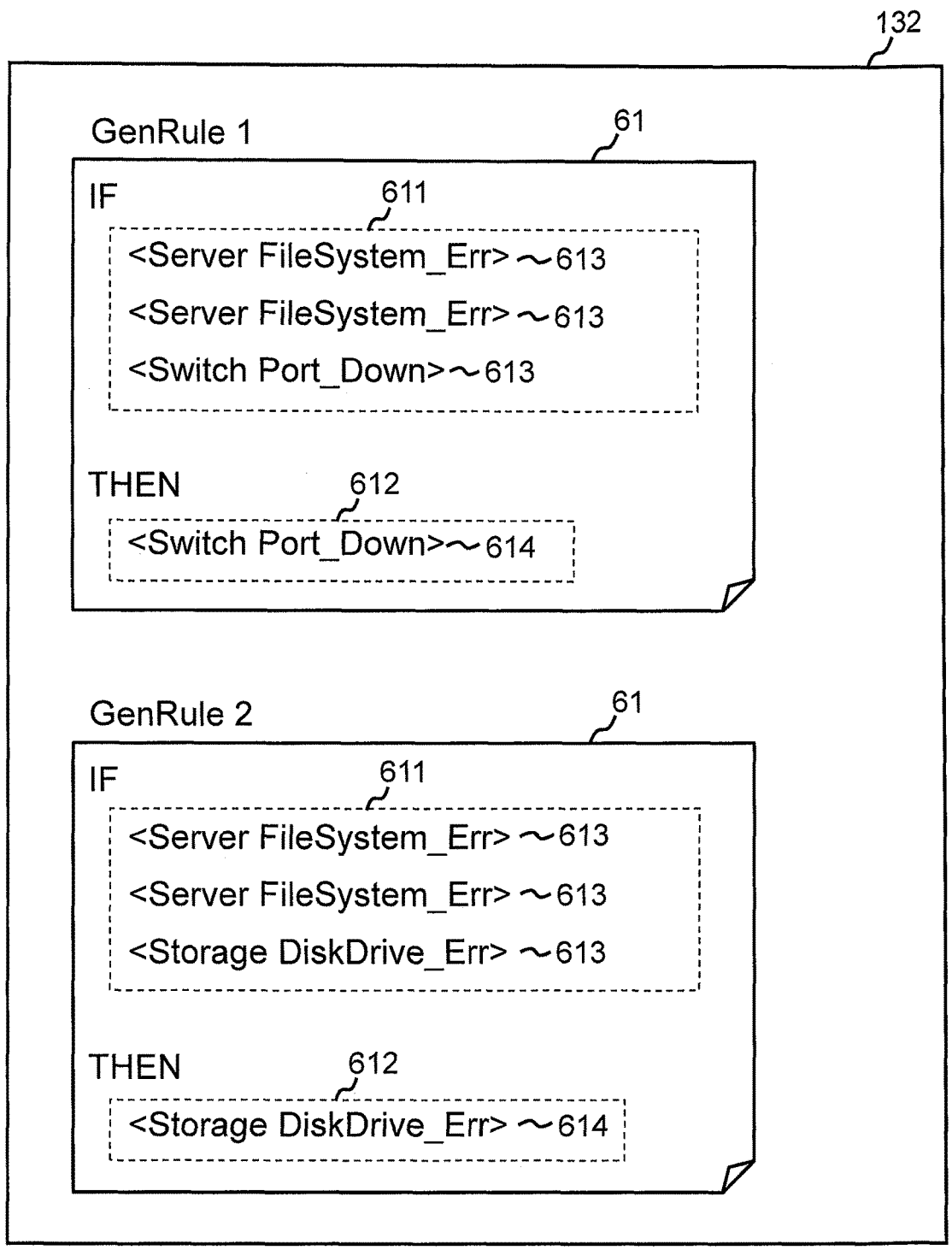
FIG. 3 is a configuration diagram illustrating an example of general rules according to the embodiment.

FIG. 3 is a configuration diagram illustrating an example of general rules according to the embodiment.

The general rule repository 132 stores one or more general rules 61. The general rule 61 is information describing corresponding relationship between one or more condition events about any one of the node apparatuses and a conclusion which becomes the cause when the one or more condition events occur, wherein the information is described in a format not dependent upon the actual configuration of the computer system. The general rule 61 may include multiple conclusions. In the present embodiment, the conclusion is an event, and the conclusion may be called a conclusion event.

The general rule 61 includes an IF portion 611 and a THEN portion 612. The IF portion 611 includes one or more condition event data elements 613. The condition event data element 613 indicates a condition event about a node apparatus abstracted based on the type, and includes, for example, data indicating the type of the node apparatus related to the condition event and data indicating the type of the condition event. The THEN portion 612 includes a conclusion event data element 614. The conclusion event data element 614 indicates a conclusion event about the node apparatus abstracted based on the type, and includes, for example, the data indicating the type of the node apparatus about the conclusion event and the data indicating the type of the conclusion event. It should be noted that the condition event data element 613 and the conclusion event data element 614 may include data indicating the type of a component related to the condition event or the conclusion event. In the present embodiment, the data indicating the type of the component related to the condition event or the conclusion event are included in the data indicating the type of the condition event or the conclusion event. For example, the event of "file system error (FileSystem_Err)" is an event about a component which is called a file system, the event of "port down (Port_Down)" is an event about a component which is called a port, and the event of "disk drive error (DiskDrive_Err)" is an event about a component which is called a disk drive 32.

For example, the general rule "GenRule 1" in the drawing includes three condition event data elements 613 and a conclusion event data element 614. More specifically, the general rule "GenRule 1" indicates that, when three condition events indicated by the three condition event data elements 613, respectively, are detected, it is identified that the conclusion event indicated by the conclusion event data element 614 is the cause. More specifically, the three condition event data elements 613 included in the general rule "GenRule 1" respectively indicate the event of "file system error" concerning the server 2, the event of "file system error" concerning the server 2, and the event of "port down" concerning the switch. The conclusion event data element 614 included in the general rule "GenRule 1" indicates the event of "port down" concerning the switch. Therefore, the general rule "GenRule 1" indicates that, when the events of the two "file system errors" concerning the two servers 2 and the event of "port down" concerning the switch are detected, it is identified that the event of "port down" concerning the switch is the cause. Likewise, the general rule "GenRule 2" indicates that, when the events of the two "file system errors" concerning the two servers 2 and the event of "disk drive error" concerning the storage 3 are detected, it is identified that the event of "disk drive error" concerning the storage 3 is the cause.

Figure 4:
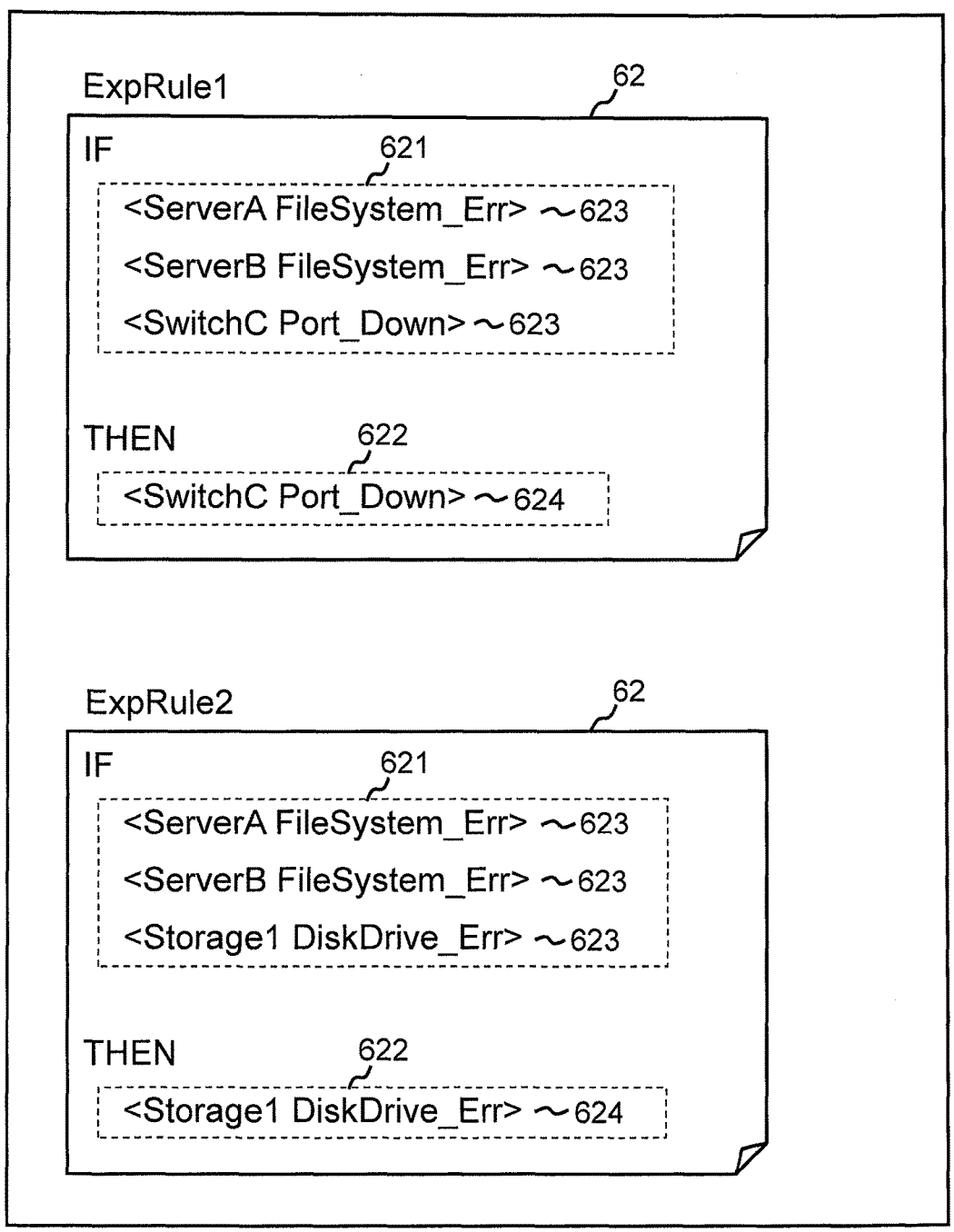
FIG. 4 is a configuration diagram illustrating an example of expanded rules according to the embodiment.

FIG. 4 is a configuration diagram illustrating an example of expanded rules according to the embodiment.

The expanded rule 62 is information made by expanding the general rule 61 into a format dependent upon the actual configuration of the computer system. The expanded rule 62 may include multiple conclusions. Like the general rule 61, the expanded rule 62 includes an IF portion 621 and a THEN portion 622. The IF portion 621 includes one or more condition event data elements 623. The condition event data element 623 indicates a condition event about a specific node apparatus, and includes, for example, the name of the node apparatus related to the condition event and the data indicating the type of the condition event. The THEN portion 622 includes a conclusion event data element 624. The conclusion event data element 624 indicates a conclusion event about a specific node apparatus, and includes, for example, the name of the node apparatus related to the conclusion event and the data indicating the type of the conclusion event. It should be noted that the condition event data element 623 and the conclusion event data element 624 may include the data indicating the name of the component related to the condition event or the conclusion event.

For example, the expanded rule "ExpRule1" in the drawing (hereinafter referred to as "rule 1") includes three condition event data elements 623 and one conclusion event data element 624. More specifically, the rule 1 indicates that, when three condition events indicated by three condition event data elements 623, respectively, are detected, it is identified that the conclusion event indicated by the conclusion event data element 624 is the cause. More specifically, the three condition event data elements 623 included in the rule 1 respectively indicate the event of "file system error" concerning the server "Server A", the event of "file system error" concerning the server "Server B", and the event of "port down" concerning the switch "Switch C". The conclusion event data element 624 included in the rule 1 indicates the event of "port down" concerning the switch "Switch C". Therefore, the rule 1 indicates that, when the event of "file system error" concerning the server "Server A", the event of "file system error" concerning the server "Server B", and the event of "port down" concerning the switch "Switch C" are detected, it is identified that the event of "port down" concerning the switch "Switch C" is the cause. Likewise, the expanded rule "ExpRule2" (hereinafter referred to as "rule 2") indicates that, when the event of "file system error" concerning the server "Server A", the event of "file system error" concerning the server "Server B", and the event of "disk drive error" concerning the storage "Storage 1" are detected, it is identified that the event of "disk drive error" concerning the storage "Storage 1" is the cause.

Figure 5:
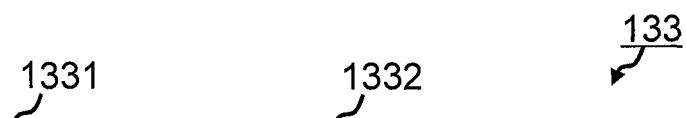
FIG. 5 is a configuration diagram illustrating an example of a polling management table according to the embodiment.

FIG. 5 is a configuration diagram illustrating an example of a polling management table according to the embodiment.

The polling management table 133 is data for managing, for each monitor target apparatus, the transmission date/time of the status request transmitted to the monitor target apparatus. The polling management table 133 includes fields of a node ID 1331 and a request transmission date/time 1332. The node ID 1331 stores an identifier of a node apparatus (hereinafter referred to as "node ID"). The request transmission date/time 1332 stores data indicating the transmission date/time of a status request transmitted to the node apparatus indicated by the node ID 1331. In a case where the monitor computer 1 receives a status response in reply to the status request from the target node apparatus, the request transmission date/time 1332 stores data indicating the reception thereof, for example "–". For example, the first entry from the top in the drawing indicates that the status request was transmitted to the node apparatus of which node ID is "70" at 9:15:11 on Apr. 13, 2008, and the statue response in reply to the status request has not yet been received by the monitor computer 1. On the other hand, the third entry from the top in the drawing indicates that the status response in reply to the status request transmitted to the node apparatus of which node ID is "100" has already been received by the monitor computer 1.

FIG. 6 is a configuration diagram illustrating an example of a status management table according to the embodiment.

The status management table 134 is data for managing the status information about the monitor target apparatus or the component thereof. The status management table 134 includes fields of a status management ID 1341, a node ID 1342, a node type 1343, a node name 1344, a component ID 1345, a component name 1346, an event type 1347, a latest status (Status) 1348, an event reception date/time 1349 of latest information collection process, a latest information collection process start date/time 1340, a previous status 134a, and a previous information collection process start date/time 134b.

The status management ID 1341 stores the identifier of an entry registered to the status management table 134 (hereinafter referred to as "status management ID"). The node ID 1342 stores the node ID of the node apparatus related to the status information. The node type 1343 stores data indicating the type of the node apparatus related to the status information. The node name 1344 stores the name of the node apparatus related to the status information. The component ID 1345 stores the identifier of the component related to the status information. The component name 1346 stores the name of the component related to the status information. The event type 1347 stores data indicating the type of an event corresponding to an abnormal status, and more specifically, data indicating the type of an event that is deemed to have occurred when the status becomes abnormal.

The latest status 1348 stores the status information indicating the latest status obtained in the request transmission processing that is performed most recently. In the present embodiment, the value of the status information is "Normal" in a case where the component of the monitor target apparatus of the target is operating normally, and the value of the status information is "Error" in a case where the component of the monitor target apparatus of the target is abnormal. The event reception date/time 1349 of the latest information collection process stores data indicating the acquisition date/time of the status information indicating the latest status, and more specifically, stores data indicating the date/time when the monitor computer 1 receives the status response in the request transmission processing that is performed most recently. The latest information collection process start date/time 1340 stores data indicating the date/time when the monitor computer 1 transmits the status request in the request transmission processing that is performed most recently. The previous status 134a stores the status information indicating the previous status, which is obtained in the previous request transmission processing. The previous information collection process start date/time 134b stores data indicating the date/time when the monitor computer 1 transmits the status request in the previous request transmission processing.

For example, the entry in which the status management ID is "1" in the drawing indicate that the latest status of file system "FileSystemA" of the server "Server A" is abnormal, and more specifically, that the event of "file system error" related to the server "Server A" has occurred. In the processing, the entry indicates that, in the request transmission processing that is performed most recently for the server "Server A", the monitor computer 1 transmitted the status request at 9:15:11 on Apr. 13, 2008, and received the status response at 9:20:11 on Apr. 13, 2008, and more specifically, the status information indicating the latest status was obtained. Further, the entry indicates that the previous status of the file system "FileSystemA" of the server "Server A" is also abnormal, and in the previous request transmission processing performed for the server "Server A", the monitor computer 1 transmitted the status request at 9:10:11 on Apr. 13, 2008.

Figure 7:
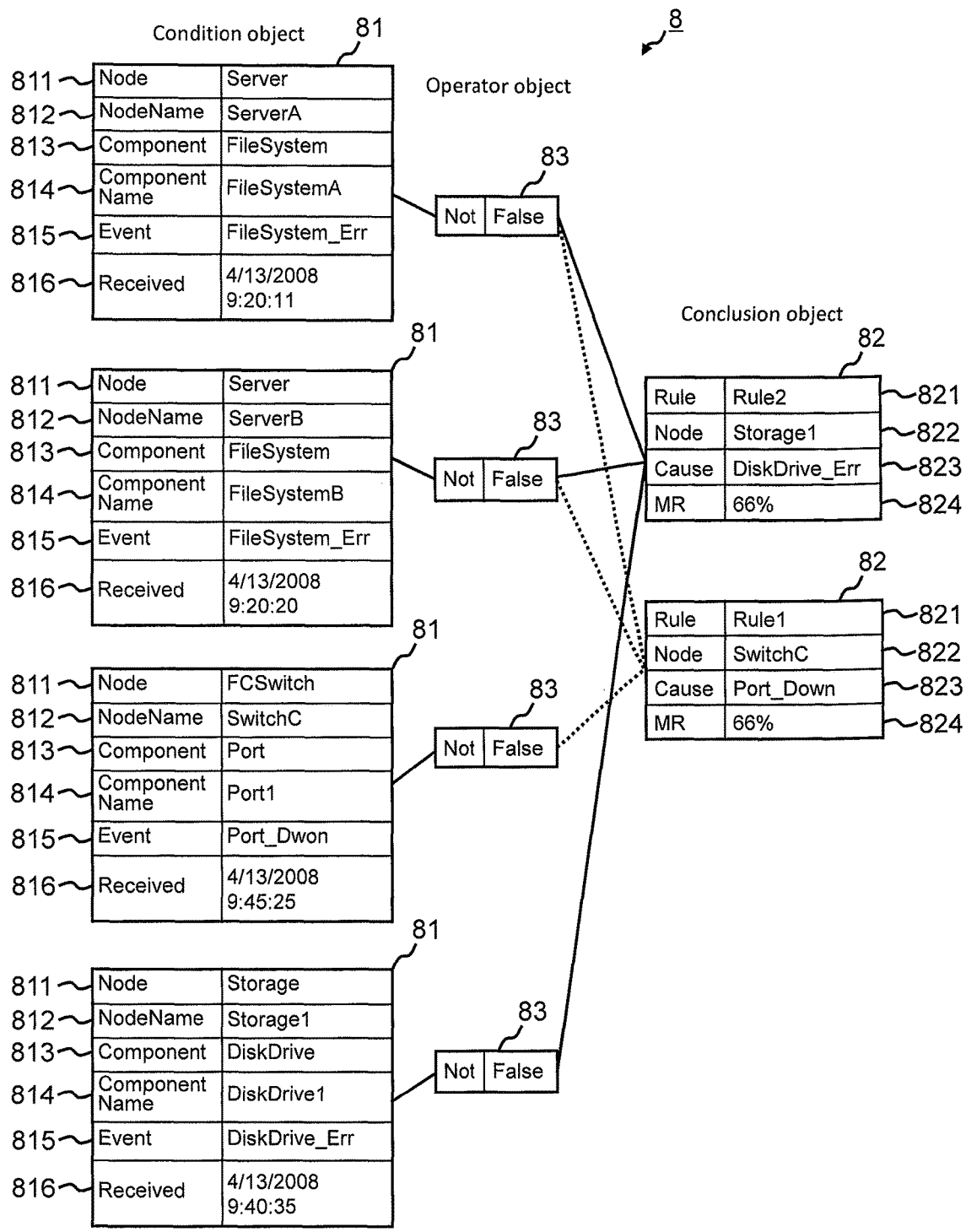
FIG. 7 is a configuration diagram illustrating an example of rule memory data according to the embodiment.

FIG. 7 is a configuration diagram illustrating an example of rule memory data according to the embodiment.

The rule memory data 8 are data that represent, using multiple objects and association therebetween, at least multiple expanded rules 62 used for the cause analysis of events, data indicating presence/absence of detection of a condition event of the expanded rule 62, and certainty indicating the certainty that the conclusion event of the expanded rule 62 is the cause. The rule memory data 8 may be generated on the basis of the expanded rule 62, or may be generated on the basis of the general rule 61 and the configuration information 131.

The rule memory data 8 includes multiple condition objects 81, multiple conclusion objects 82, multiple operator objects 83, and connection information therebetween. The condition object 81 corresponds to the condition event of the expanded rule 62, and the conclusion object 82 corresponds to the conclusion event of the expanded rule 62. The condition object 81 and the conclusion object 82 are connected via the operator object 83. The connection relationship between the condition object 81 and the conclusion object 82 indicates a corresponding relationship between the condition event and the conclusion event of the expanded rule 62. It should be noted that each object is implemented as, e.g., a structural body or a class of the computer language, and it is data stored in the memory (object data) while the program is operating.

The condition object 81 is an object managing data about the condition event. The condition object 81 includes fields of a Node 811, a NodeName 812, a Component 813, a ComponentName 814, an Event 815, and a Received 816. The Node 811 stores data indicating the type of the node apparatus related to the condition event corresponding to the condition object 81. The NodeName 812 stores the name of a node apparatus related to condition event corresponding to the condition object 81. The Component 813 stores data indicating the type of a component related to the condition event corresponding to the condition object 81. The ComponentName 814 stores the name of the component related to the condition event corresponding to the condition object 81. The Event 815 stores data indicating the type of the condition event corresponding to the condition object 81. The Received 816 stores data indicating the date/time when the condition event corresponding to the condition object 81 is detected by the monitor computer 1 (detection date/time).

For example, the first condition object 81 from the top of the drawing manages the data about the condition event of "file system error" related to the server "Server A". The Received 816 of the condition object stores "Apr. 13, 2008 9:20:11". Therefore, this condition object indicates that the condition event of "file system error" related to the server "Server A" was detected by the monitor computer 1 at 9:20:11 on Apr. 13, 2008.

The conclusion object 82 is an object for managing data about the conclusion event. The conclusion object 82 includes fields of a Rule 821, a Node 822, a Cause 823, and an MR 824. The Rule 821 stores the name of the expanded rule 62 including the conclusion event corresponding to the conclusion object 82. The Node 822 stores the name of a node apparatus related to the conclusion event corresponding to the conclusion object 82. The Cause 823 stores data indicating the type of the conclusion event corresponding to the conclusion object 82. The MR 824 stores the certainty about the conclusion event corresponding to the conclusion object 82. The certainty is calculated in the certainty calculation processing to be described later.

It should be noted that the rule memory data 8 is not limited to the structure illustrated in FIG. 7, and may be another data structure that can represent the corresponding relationship of the condition event and the conclusion event, presence/absence of detection of the condition event, and the certainty about the conclusion event.

FIG. 8 is a configuration diagram illustrating an example of an event valid period configuring table according to the embodiment.

The event valid period configuring table 135 is data for managing a valid period which is configured for each event. In this case, a valid period of the event means a period in which an event detected by the monitor computer 1 is treated as having been detected in the cause analysis, and more specifically, a period in which the detection of the event is treated as being valid. In a case where, for example, the valid period of the event A is configured as B, and the monitor computer 1 has detected the event A in a certain date/time C, the detection of the event A is valid until the valid period B passes since the date/time C, and the cause analysis is performed while the event A is treated as having been detected. Then, the detection of the event A is invalid until the monitor computer 1 detects the event A again after the valid period B passes since the date/time C, and the cause analysis is performed while the event A is treated as not having been detected.

The event valid period configuring table 135 includes fields of a node type 1351, an event type 1352, and a valid period 1353. The node type 1351 stores data indicating the type of the node apparatus related to the event. The event type 1352 stores data indicating the type of an event. The valid period 1353 stores data indicating the valid period which is configured for an event. For example, the third entry from the top in the drawing indicates that a valid period "10" (minute) is configured for an event "file system error" concerning the server 2.

FIG. 9 is a configuration diagram illustrating an example of an event expiration task table according to the embodiment.

The event expiration task table 136 is data for managing information about an event expiration task about an event detected by the monitor computer 1. In this case, the event expiration task means a task of invalidating detection of an event, of which valid period has passed. The event expiration task table 136 includes fields of a start date/time 1361, a node name 1362, and an event type 1363. The start date/time 1361 stores data indicating a data/time when execution of the event expiration task is started (hereinafter referred to as "task start date/time"). The task start date/time is, for example, a date/time obtained by adding the valid period configured for the event in question to the date/time when the event of the event expiration task to be targeted is detected. The node name 1362 stores the name of a node apparatus related to the event of the event expiration task to be targeted. The event type 1363 stores data indicating the type of an event of the event expiration task to be targeted. For example, the first entry from the top of the drawing indicates that the event expiration task for the event of "file system error" concerning the server "Server A" is started at 9:20:11 on Apr. 13, 2008.

Figure 10:
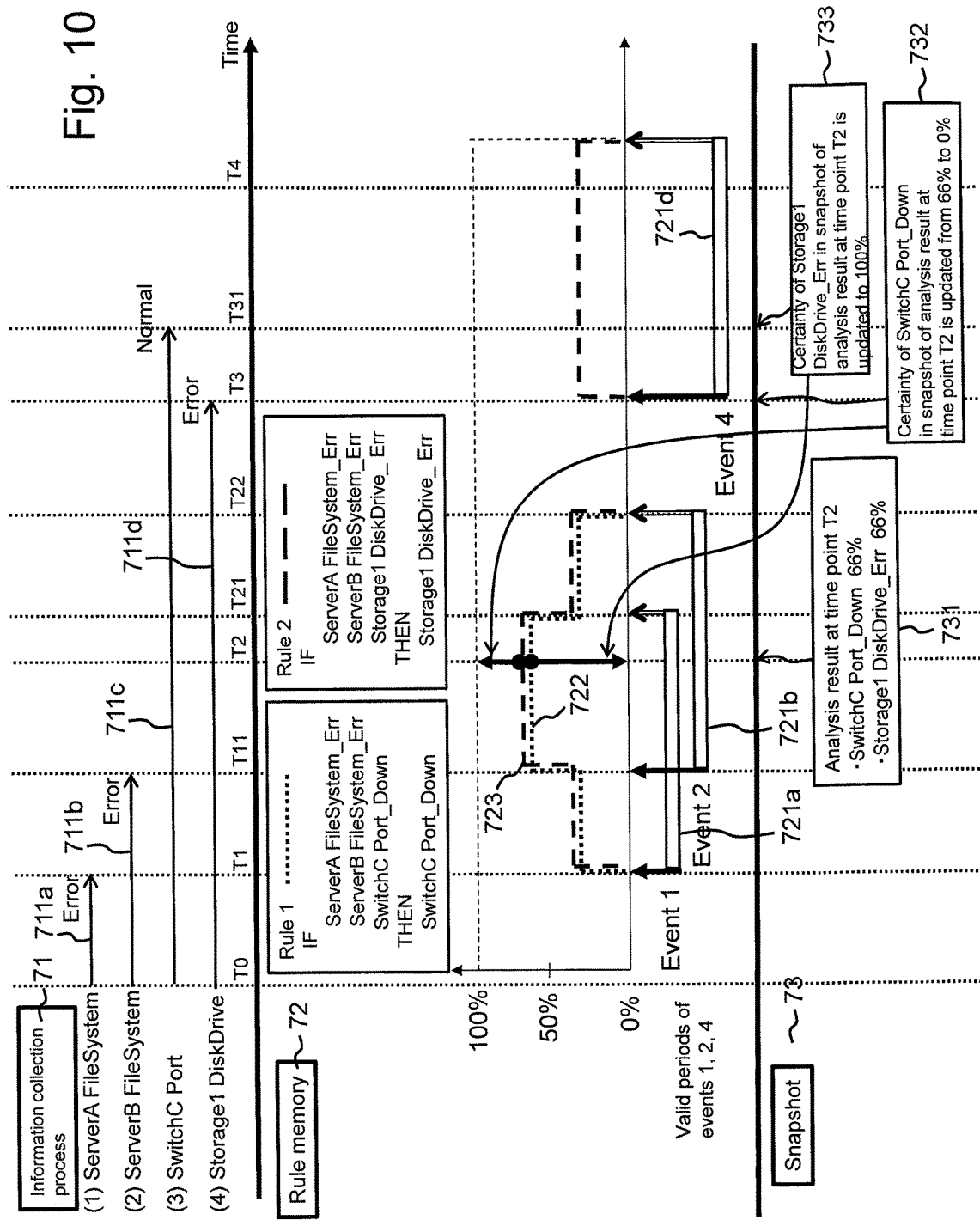
FIG. 10 is a diagram illustrating an example of changes of an analysis result over time and an analysis result snapshot according to the embodiment.

FIG. 10 is a diagram illustrating an example of changes of an analysis result over time and an analysis result snapshot according to the embodiment.

The drawing is an example in a case where the cause analysis is performed on the basis of two expanded rules 62 (rules 1 and 2) described in FIG. 4. The monitor target apparatuses related to the rules 1 or 2 include four apparatuses, i.e., the server "Server A", the server "Server B", the switch "Switch C", and the storage "Storage 1".

The four arrows 711 (711a, 711b, 711c, and 711d) in the information collection process item 71 in the drawing indicate periods, from when the status request is transmitted to when the status response is received, of each of the four monitor target apparatuses. In this example, the monitor computer 1 transmits the status requests, at the same time, to the four monitor target apparatuses at the time point T0. Then, at the time point T1, the monitor computer 1 receives a status response indicating that abnormality has occurred in the file system from the server "Server A" (see arrow 711a). More specifically, at the time point T1, the monitor computer 1 detects the occurrence of the event of the "file system error" concerning the server "Server A" (hereinafter referred to as "event 1"). Then, at the time point T11, the monitor computer 1 receives a status response indicating that abnormality has occurred in the file system from the server "Server B" (see arrow 711b). More specifically, at the time point T11, the monitor computer 1 detects the occurrence of the event of the "file system error" concerning the server "Server B" (hereinafter referred to as "event 2"). Then, at the time point T3, the monitor computer 1 receives a status response indicating that abnormality has occurred in the disk drive 32 from the storage "Storage 1" (see arrow 711d). More specifically, at the time point T3, the monitor computer 1 detects the occurrence of the event of the "disk drive error" concerning the storage "Storage 1" (hereinafter referred to as "event 4"). Then, at the time point T31, the monitor computer 1 receives a status response indicating that the port is normal from the switch "Switch C" (see arrow 711c). More specifically, at the time point T31, the monitor computer 1 recognizes that the event of "port down" concerning the switch "Switch C" (hereinafter referred to as "event 3") has not occurred.

Three rectangles 721 (721*a*, 721*b*, and 721*d*) in the rule memory item 72 in the drawing indicate valid periods of three events detected. More specifically, the rectangle 721*a* indicates a valid period of the event 1. The detection of the event 1 is valid for a predetermined period from the time point T1, and more specifically, valid until a valid period which is configured for the event 1 passes. The rectangle 721*b* indicates a valid period of the event 2. The detection of the event 2 is valid for a predetermined period from the time point T11, and more specifically, valid until a valid period which is configured for the event 2 passes. The rectangle 721*d* indicates a valid period of the event 4. The detection of the event 4 is valid for a predetermined period from the time point 3, and more specifically, valid until a valid period which is configured for the event 4 passes.

A dotted line 722 in the rule memory item 72 in the drawing indicates an analysis result about the rule 1 obtained by the certainty calculation processing. More specifically, the dotted line 722 in the rule memory item 72 in the drawing indicates changes, over time, of the certainty indicating the certainty that the event 3, which is the conclusion event of the rule 1, is the cause (hereinafter referred to as "the certainty of the rule 1"). At the time point T1, one of the condition events of the rule 1, more specifically, the event 1 has been detected, and therefore, the certainty of the rule 1 at the time point T1 is 33% (⅓×100%) (fractional part thereof is omitted). Thereafter, at the time point T11, the event 2 is detected. At the time point T11, detections of two of the condition events of the rule 1, more specifically, the event 1 and the event 2 are valid, and therefore, the certainty of the rule 1 increases from 33% to 66% (⅔×100%) (fractional part thereof is omitted). Thereafter, when the detection of the event 1 becomes invalid at the time point T21, the certainty of the rule 1 decreases to 33%. When the detection of the event 2 becomes invalid at the time point T22, the certainty of the rule 1 becomes 0%.

A broken line 723 in the rule memory item 72 in the drawing indicates an analysis result about the rule 2 obtained by the certainty calculation processing. More specifically, the broken line 723 indicates changes, over time, of the certainty indicating the certainty that the event 4 which is the conclusion event of the rule 2 is the cause (hereinafter referred to as "the certainty of the rule 2"). Like the rule 1, the rule 2 includes the event 1 and the event 2 as condition events. In addition, the rule 2 includes the event 4 as the condition event. Like the rule 1, the rule 2 includes totally three condition events. More specifically, in the rule 1 and the rule 2, the population parameters when the certainties are calculated are the same. Like the event 3 which is the condition event of the rule 1 other than the event 1 and the event 2, the event 4 which is the condition event of the rule 2 other than the event 1 and the event 2 is not detected in the period between T1 and T22. Therefore, the change in the value of the certainty of the rule 2 in the period between T1 and T22 is the same as that of the rule 1.

In the example of the drawing, at the time point T3, the event 4 which is the condition event of the rule 2 is detected. However, at the time point T3, the valid period of the condition event of the rule 2 other than the event 4, more specifically, the event 1 and the event 2, has already elapsed, and the detection thereof is already invalidated. Therefore, at the time point T3, the certainty of the rule 2 is 33% (⅓×100%). More specifically, at the time point T3, the three condition events of the rule 2 are all detected by the monitor computer 1. However, due to the valid period of the event and deviation of the detections date/time of events, the certainty of the rule 2 (the certainty obtained in the certainty calculation processing) does not become 100%. More specifically, the peak value of the certainty of the rule 2 obtained in the certainty calculation processing is 66% which is the same as that of the rule 1. For this reason, the administrator cannot find out whether the conclusion event of the rule 1 is the cause or the conclusion event of the rule 2 is the cause by just looking up the certainty obtained in the certainty calculation processing, i.e., the certainty indicated by the dotted line 722 and the broken line 723.

More specifically, in a case where the valid periods of the events are increased, periods in which detections of multiple condition events are valid may overlap each other with a higher degree of possibility even when the multiple condition events are detected with an interval therebetween. As a result, a higher certainty can be obtained. However, when the valid periods of the events are long, detection of an irrelevant event (for example, an event that occurred due to the previously occurred cause) may remain valid, and more specifically, the noise increases, which makes it impossible to perform accurate cause analysis. Therefore, the valid periods of the events cannot be increased more than necessary.

With predetermined timing, the monitor computer 1 according to the present embodiment generates data indicating analysis result at that time point and saves the analysis result to the storage resource 12. In the description below, the data indicating the analysis result at a certain time point saved in the storage resource 12 will be referred to as "analysis result snapshot". For example, the monitor computer 1 may generate an analysis result snapshot after a certain period of time passes since receiving the event, or may generate an analysis result snapshot after the certainty is calculated in the certainty calculation processing. In the case where the analysis result snapshot is generated after the certain period of time passes since the event is received, the certain period of time may be, for example, a constant period of time regardless of the type of an event received. Alternatively, the certain period of time may be a value that is different according to the type of an event, for example, a long value when the event is of a high degree of importance, and a short value when the event is of a low degree of importance. The timing with which analysis result snapshots are generated may be determined on the basis of transmission cycle of the status request in the request transmission processing. For example, when the transmission cycle of the status request is A, the monitor computer 1 may generate analysis result snapshots with a cycle which is several times of A (for example, 1.5 times, 2 times) or a fraction of A.

In the example in the drawing, the monitor computer 1 generates an analysis result snapshot at the time point T2, which is the time point after a certain period of time has passed since a detection of the first event, i.e., the detection of the event 1. Both of the certainties of the rule 1 and the rule 2 indicated by the analysis result snapshot are 66% at the time point when the analysis result snapshot is generated, i.e., the time point T2.

When the monitor computer 1 according to the present embodiment receives the status response, the monitor computer 1 updates the analysis result indicated by the analysis result snapshot generated in the past, on the basis of the status information included in the received status response. The analysis result snapshot of the target to be updated is an analysis result snapshot generated, e.g., from the transmission date/time of the status request corresponding to the status response received, i.e. the status request that requested the status response received, to the reception date/time of the status response received (except the transmission date/time of the status request corresponding to the status response received and the reception date/time of the status response received). As described later with reference to FIG. 11, for example, an analysis result snapshot generated between the transmission date/time of the status request corresponding to the status response received previously and the reception date/time of the status response received most recently (except the transmission date/time of the previous status request and the reception date/time of the most recent status response) may be the target to be updated.

For example, in a case where the status information included in the received status response is "Error", and the occurrence of an event is detected, the monitor computer 1 updates, to a value determined in view of the detection of the event, the certainty of the expanded rule 62 including the detected event as the condition event in the certainties indicated by the target analysis result snapshot. For example, in a case where the status information included in the received status response is "Normal", and the monitor computer 1 recognizes that an event has not occurred, the monitor computer 1 updates, to 0%, the certainty of the expanded rule 62 in which the event recognized not to have occurred is the conclusion event in the certainties indicated by the target analysis result snapshot.

In the example of FIG. 10, at the time point T3, the monitor computer 1 receives the status response indicating that abnormality has occurred in the disk drive 32 (which will be referred to as "response (4)" in the description about FIG. 10) from the storage "Storage1", and detects the occurrence of the event 4. In this case, the status request corresponding to the response (4) is transmitted at the time point T0, and therefore, the analysis result snapshot generated in the period between T0 and T3, i.e., the analysis result snapshot generated at the time point T2 in the example in the drawing (which will be referred to as "snapshot T2" in the description of FIG. 10) is the update target. Accordingly, the monitor computer 1 updates, to a value determined in view of the detection of the event 4, the certainty of the rule including the event 4 as the condition event in the certainties indicated by the snapshot T2, i.e., the certainty of the rule 2. More specifically, the certainty of the rule 2 at the snapshot T2 is updated from 66% to 100% (3/3×100%).

At the time point T31, the monitor computer 1 receives the status response indicating that the port is normal (which will be referred to as "response (3)" in the description about FIG. 10) from the switch "Switch C", and recognizes that the event 3 has not occurred. In this case, the status request corresponding to the response (3) was transmitted at the time point T0, and therefore, the analysis result snapshot generated in the period between 0 and 31, i.e., the snapshot T2 in the example in the drawing, is the target to be updated. Accordingly, the monitor computer 1 updates, to 0%, the certainty of the rule including the event 3 as the conclusion event in the certainties indicated by the snapshot T2, i.e., the certainty of the rule 1.

The administrator can find out that the conclusion event of the rule 2, i.e. the event 4, is the cause by looking up the updated certainty indicated by the snapshot T2. In this manner, the administrator can identify the cause more accurately by looking up not only the certainty obtained in the certainty calculation processing but also the certainty indicated by the analysis result snapshot.

Figure 11:
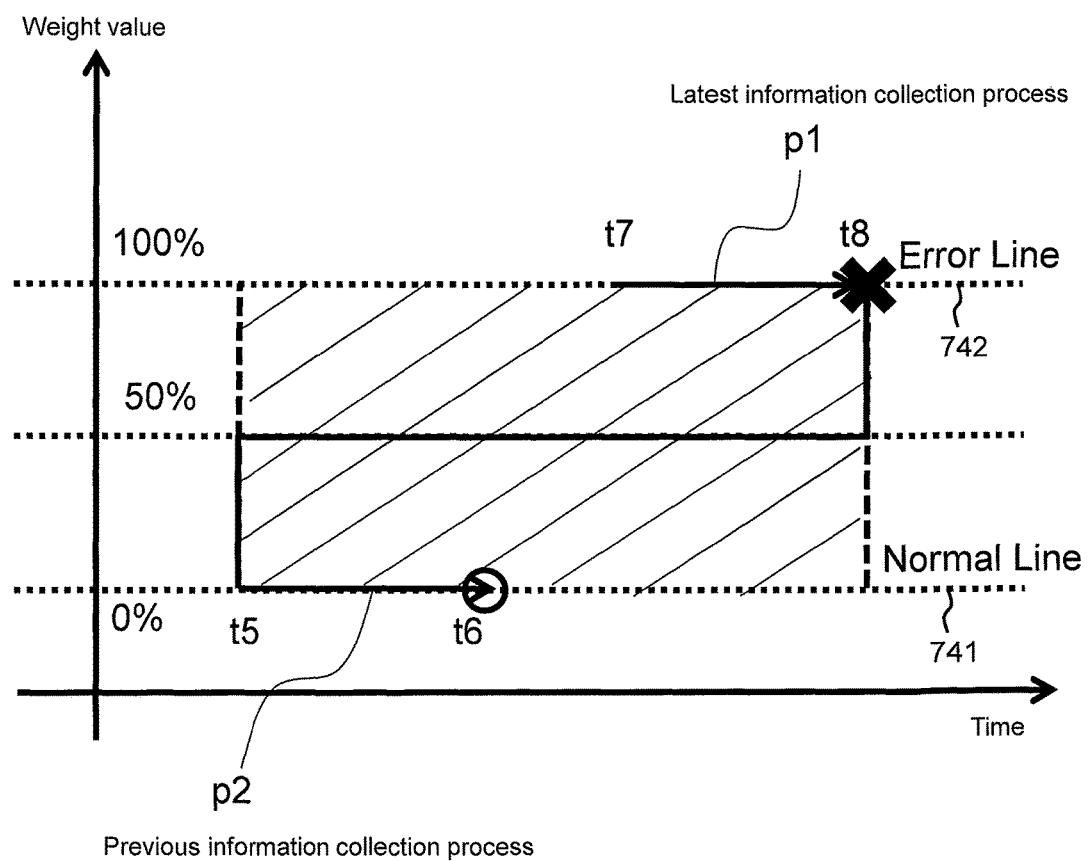
FIG. 11 is a diagram illustrating an example of an update target range of an analysis result snapshot according to the embodiment.

FIG. 11 is a diagram illustrating an example of an update target range of an analysis result snapshot according to the embodiment.

In the drawing, an arrow p1 indicates a period from when the status request is transmitted to when the status response is received in the request transmission processing that is performed most recently. More specifically, in the request transmission processing that is performed most recently, the monitor computer 1 transmits the status request at the time point t7, and receives the status response at the time point t8. The status response received at the time point t8, i.e., most recent status response (which will be referred to as "response p1" in the description of FIG. 11) indicates an abnormal status. An arrow p2 indicates a period from when the status request is transmitted to when the status response is received in the request transmission processing that is performed previously. More specifically, in the request transmission processing that is performed previously, the monitor computer 1 transmits the status request at the time point t5, and receives the status response at the time point t6. The status response received at the time point t6, i.e., previous status response (which will be referred to as "response p2" in the description of FIG. 11) indicates a normal status.

As described above, when the status indicated by the response p1 has been changed from the status indicated by the response p2, the status has been changed at any given time point in a period from when the previous status request (which is the status request transmitted at the time point t5 and will be referred to as "request p2" in the description of FIG. 11) is transmitted to when the response p1 is received, i.e., a period between t5 and t8 (excluding the points t5 and t8). More specifically, the time point when the status is changed is not limited to a time point in a period from when the monitor computer 1 receives the response p2 to when the monitor computer 1 thereafter receives the response p1, i.e., a time point in a period between t6 and t8, and may be a time point in a period between t5 and t6 (excluding the points t5). This is because there is a difference in terms of time between the time point when the status response is transmitted by the node apparatus and the time point when the status response thereof is received by the monitor computer 1. More specifically, it is not clear at what time point between t5 and t6 the response p2 has been transmitted, and more specifically, it is not clear status of what time point between t5 and t6 the is indicated. For example, the response p2 may have been transmitted immediately after t5 passes, and thereafter, the status may have been changed to abnormal immediately after that. In this case, the status is abnormal in most of the period between t5 and t6. When such a case is taken into consideration, the analysis result indicated by the analysis result snapshot generated in the period between t5 and t6 and updated on the basis of the response p2 may not be accurate. Therefore, in the monitor computer 1 according to the present embodiment, the analysis result snapshot generated in the period from the transmission date/time of the request p2 (previous status request) to the reception date/time of the response p1 (most recent status response), i.e., the analysis result snapshot generated in the period between t5 and t8 (excluding the points t5 and t8) is the target to be updated on the basis of the response p1.

When the monitor computer 1 updates the analysis result snapshot, the monitor computer 1 looks up a weight value that is configured for the condition event. In the present embodiment, the weight value is of a value in a range from 0% to 100%. A weight value 0% indicates that the condition event for which the weight value is configured has not occurred, and more specifically, indicates that the status of the node apparatus related to the condition event is normal. The weight value 100% indicates that the condition event for which the weight value is configured has occurred, more specifically, that the status of the node apparatus related to the condition event is abnormal. For example, when the status response is received, the monitor computer 1 configures, to the weight value, the condition event of the node apparatus that transmitted the status response in the condition events related to the analysis result snapshot of the update target, on the basis of the status information included in the status response received. In this case, the condition event related to the analysis result snapshot means a condition event included in the expanded rule 62 corresponding to the certainty indicated by the analysis result snapshot (the expanded rule 62 related to the analysis result snapshot).

As shown in FIG. 11, in a case where the status indicated by the response p1 is changed from the status indicated by the response p2, it is not clear at which time point in the period between t5 and t8 (excluding the points t5 and t8) the status was changed. More specifically, the monitor computer 1 is unable to identify whether the status of the node apparatus that transmitted the response p1 and response p2 was normal or abnormal in the period between t5 and t8. Therefore, in a case where the status indicated by the response p1 is changed from the status indicated by the response p2, the monitor computer 1 configures the condition events related to the node apparatuses that transmitted the response p1 and response p2 in the condition events related to the analysis result snapshot of the update target to a weight value 50% which is an intermediate value between a weight value (0%) indicating that the status is normal and a weight value (100%) indicating that the status is abnormal. It should be noted that the analysis result snapshot of the update target is an analysis result snapshot generated in a period from the transmission date/time of the request p2 to the reception date/time of the response p1, i.e., the period between t5 and t8 (excluding the points t5 and t8).

Figure 12B:
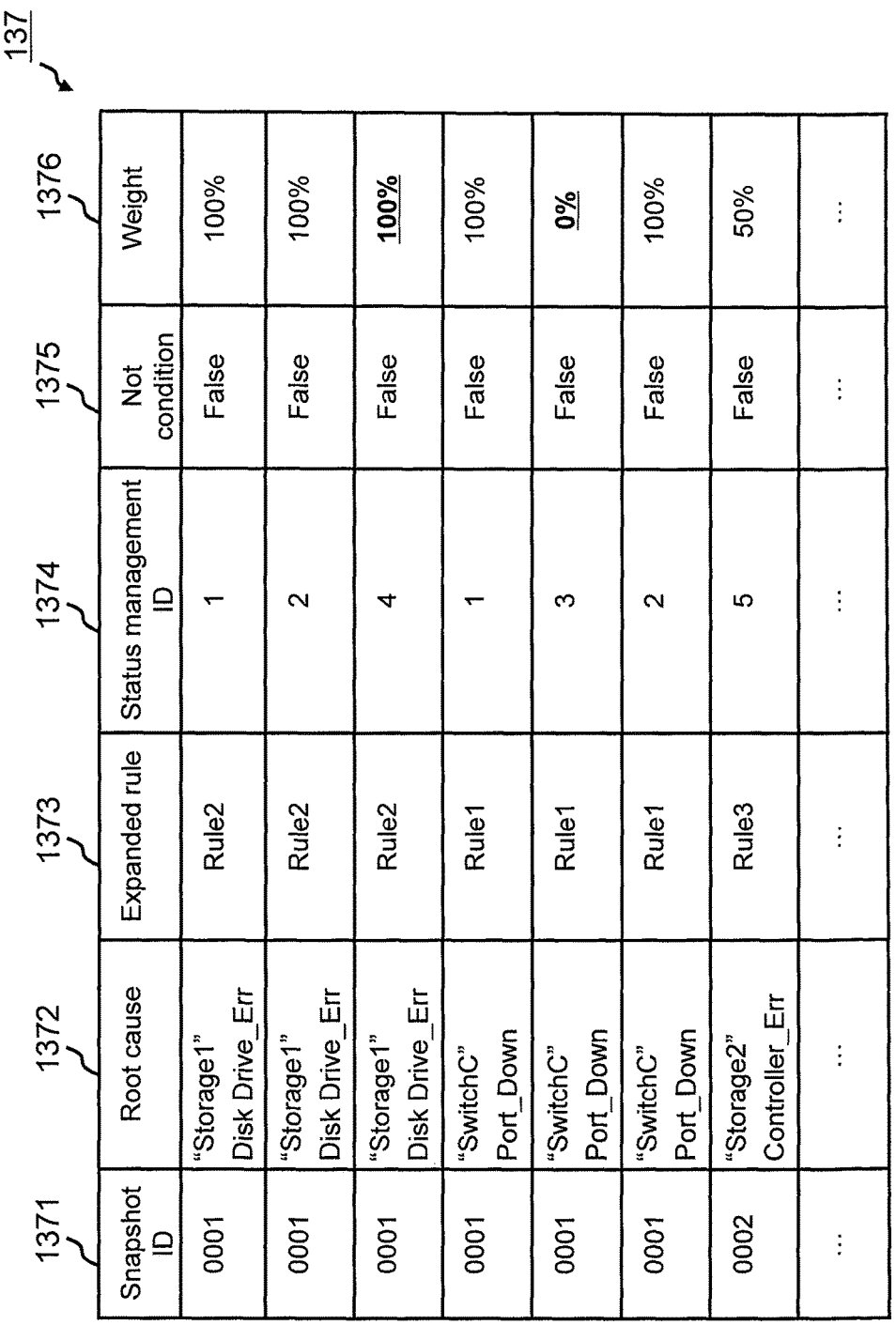
FIG. 12B is a diagram illustrating a second example of the condition table according to the embodiment.

FIG. 12A is a diagram illustrating a first example of a condition table according to the embodiment. FIG. 12B is a diagram illustrating a second example of a condition table according to the embodiment.

The condition table 137 is data for managing, for each analysis result snapshot, condition events related to the analysis result snapshot and weight values that are configured for the condition events. The condition table 137 includes fields of a snapshot ID 1371, a root cause 1372, an expanded rule 1373, a status management ID 1374, a Not condition 1375, and a weight 1376.

The snapshot ID 1371 stores the identifier of an analysis result snapshot (hereinafter referred to as "snapshot ID"). The root cause 1372 stores data indicating the conclusion event included in the expanded rule 62 related to the analysis result snapshot indicated by the snapshot ID of the snapshot ID 1371 (which will be referred to as "target snapshot" in the description of FIG. 12). The expanded rule 1373 stores the name of the expanded rule 62 related to the target snapshot. The status management ID 1374 stores data indicating the condition event related to the target snapshot. In the present embodiment, the identifier of an entry in the status management table 134 of FIG. 6 (status management ID) is employed as the data indicating a condition event. More specifically, the status management ID 1374 stores the status management ID of an entry of the status management table 134 that manages the status corresponding to the condition event related to the target snapshot. The Not condition 1375 stores data referred to when re-calculating the certainty of the analysis result snapshot, for example, stores "True" or "False". The value "True" in the Not condition 1375 indicates that the certainty decreases in a case where the condition event indicated by the status management ID of the status management ID 1374 (which will be referred to as "target condition event" in the description of FIG. 12) is detected. The value "False" in the Not condition 1375 indicates that the certainty increases in a case where the target condition event is detected. In the present embodiment, the values of the Not condition 1375 are all "False". The weight 1376 stores the weight value that is configured for the target condition event in the target snapshot.

FIG. 12A illustrates the condition table 137 at the time point T2 of FIG. 10. For example, the first to the sixth entries from the top in the drawing indicate that the analysis result snapshots having a snapshot ID "0001" (hereinafter referred to as "snapshot 1") show the analysis results of the rule 1 and the rule 2, and that four condition events indicated by the status IDs "1" to "4", i.e., the event 1, the event 2, the event 3, and the event 4, exist as the condition events related to the snapshot 1. The first entry from the top of the drawing indicates that, at the time point T2, a weight value 100% indicating that the event 1 has occurred is configured for the event 1 in the snapshot 1. The third and fifth entries from the top of the drawing indicate that, at the time point T2, a weight value has not yet been configured for the event 4 and the event 3 in the snapshot 1, more specifically, that the monitor computer 1 has not yet received the status response related to the event 3 and the status response related to the event 4.

FIG. 12B indicates the condition table 137 at the time point T4 of FIG. 10. The third entry from the top of the drawing indicates that, at the time point T4, a weight value 100% indicating that the event 4 has occurred is configured for the event 4 in the snapshot 1. As can be seen from the comparison between FIG. 12A and FIG. 12B, the weight value of the event 4 in the snapshot 1 is changed from nil to 100%. This is because, at the time point T3 of FIG. 10, the monitor computer 1 receives the response (4), detects the occurrence of the event 4, and changes the weight value of the event 4 in the snapshot 1 to 100% on the basis thereof. The fifth entry from the top of the drawing indicates that, at the time point T4, a weight value 0% indicating that the event 3 has not occurred is configured for the event 3 in the snapshot 1. As can be seen from the comparison between FIG. 12A and FIG. 12B, the weight value of the event 3 in the snapshot 1 is changed from nil to 0%. This is because at the time point T31 of FIG. 10, the monitor computer 1 receives the response (3), recognizes that the event 3 does not occur, and changes the weight value of the event 3 in the snapshot 1 to 0% on the basis thereof.

Figure 13B:
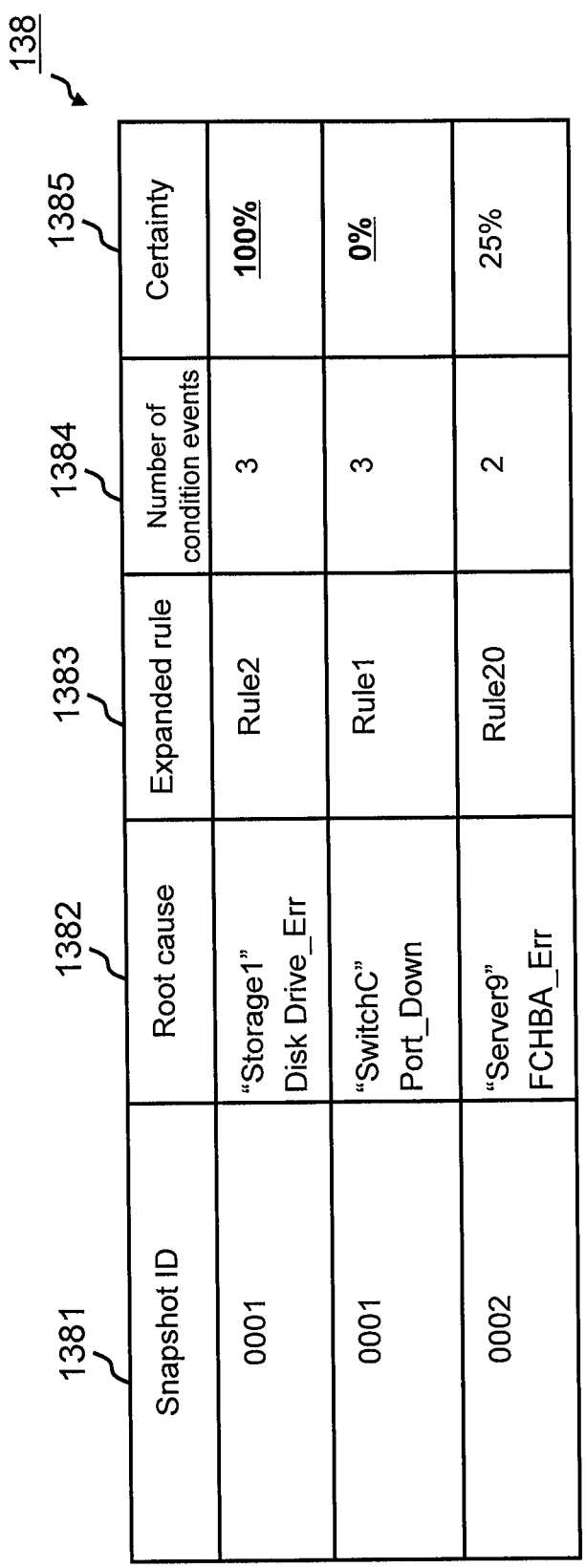
FIG. 13B is a diagram illustrating a second example of the expanded rule table according to the embodiment.

FIG. 13A is a diagram illustrating a first example of an expanded rule table according to the embodiment. FIG. 13B is a diagram illustrating a second example of an expanded rule table according to the embodiment.

The expanded rule table 138 is data for managing, for each analysis result snapshot, the expanded rule 62 related to the analysis result snapshot and the certainty related to the expanded rule 62. The expanded rule table 138 includes fields of a snapshot ID 1381, a root cause 1382, an expanded rule 1383, the number of condition events 1384, and a certainty 1385.

The snapshot ID 1381 stores the snapshot ID. The root cause 1382 stores data indicating the conclusion event included in the expanded rule 62 related to the analysis result snapshot indicated by the snapshot ID of the snapshot ID 1381 (which will be referred to as "target snapshot" in the description of FIG. 13). The expanded rule 1383 stores the name of the expanded rule 62 related to the target snapshot. The number of condition events 1384 stores the total number of condition events included in the expanded rule 62 indicated by the expanded rule 1383. The certainty 1385 stores the certainty, in the target snapshot, of the expanded rule 62 indicated by the expanded rule 1383.

FIG. 13A illustrates a specific example of an expanded rule table 138 at the time point T2 of FIG. 10. For example, the first entry from the top of the drawing indicates that the rule 2 which is the expanded rule 62 related to the snapshot 1 includes three condition events, and at the time point T2, the certainty of the rule 2 in the snapshot 1 is 66%. The second entry from the top of the drawing indicates that the rule 1 which is the expanded rule 62 related to the snapshot 1 includes three condition events, and at the time point T2, the certainty of the rule 1 in the snapshot 1 is 66%.

FIG. 13B illustrates a specific example of an expanded rule table 138 at the time point T4 of FIG. 10. The first entry from the top of the drawing indicates that, at the time point T4, the certainty of the rule 2 in the snapshot 1 is 100%. As can be seen from the comparison between FIG. 13A and FIG. 13B, the certainty of the rule 2 in the snapshot 1 is changed from 66% to 100%. This is because, at the time point T3 of FIG. 10, the monitor computer 1 detects occurrence of the event 4, and changes the certainty of the rule 2 in the snapshot 1 to a value determined in view of detection of the event 4 on the basis thereof. The second entry from the top of the drawing indicates that, at the time point T4, the certainty of the rule 1 in the snapshot 1 is 0%. As can be seen from the comparison between FIG. 13A and FIG. 13B, the certainty of the rule 1 in the snapshot 1 is changed from 66% to 0%. This is because at the time point T31 of FIG. 10, the monitor computer 1 recognizes that the event 3 which is the conclusion event of the rule 1 has not occurred, and changes the certainty of the rule 1 in the snapshot 1 to 0% on the basis thereof.

Figure 14A:
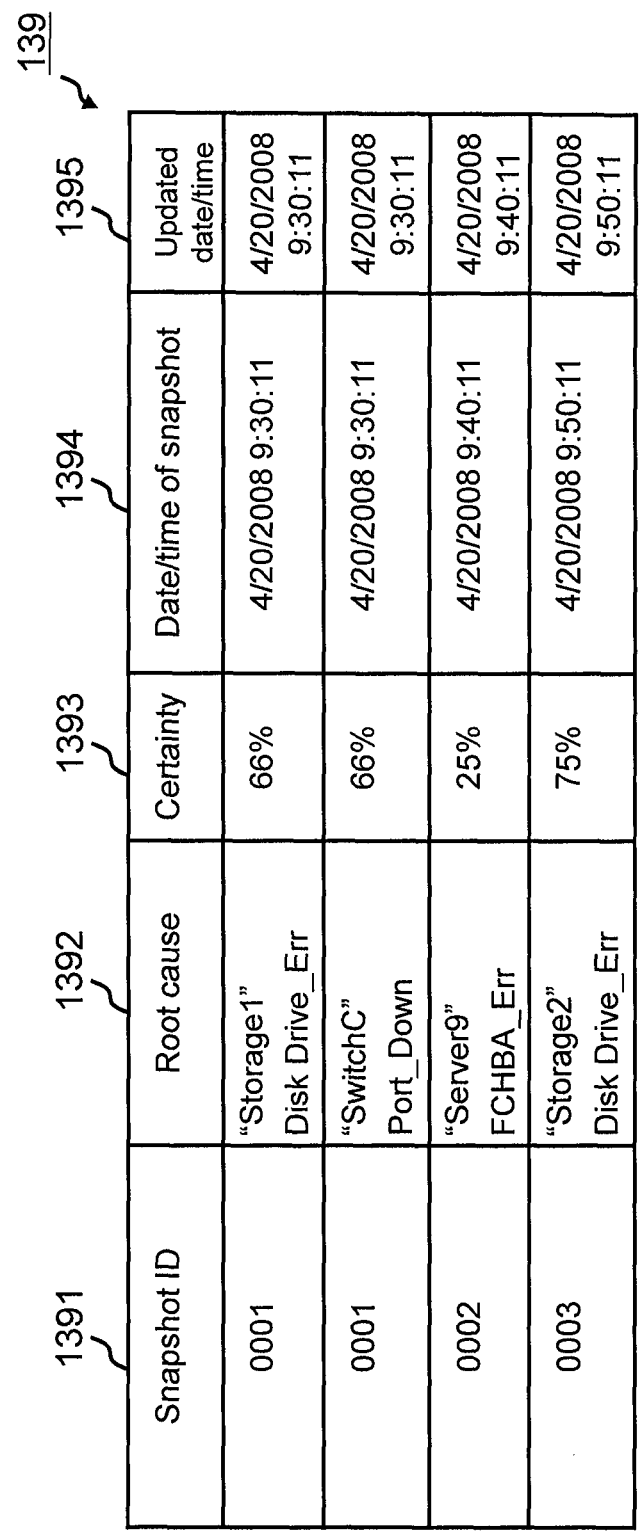
FIG. 14A is a diagram illustrating a first example of a snapshot table according to the embodiment.

FIG. 14A is a diagram illustrating a first example of a snapshot table according to the embodiment. FIG. 14B is a diagram illustrating a second example of a snapshot table according to the embodiment.

The snapshot table 139 is data for managing information about an analysis result snapshot. The snapshot table 139 includes fields of a snapshot ID 1391, a root cause 1392, a certainty 1393, a date/time of snapshot 1394, and an updated date/time 1395.

The snapshot ID 1391 stores a snapshot ID. The root cause 1392 stores data indicating the conclusion event included in the expanded rule 62 related to the analysis result snapshot indicated by the snapshot ID of the snapshot ID 1391 (which will be referred to as "target snapshot" in the description of FIG. 14). The certainty 1393 stores the certainty, in the target snapshot, of the expanded rule 62 including the conclusion event indicated by the root cause 1392. The date/time of snapshot 1394 stores data indicating the data/time when the target snapshot is generated (generation date/time). The updated date/time 1395 stores data indicating the date/time when the target snapshot is updated (updated date/time). For example, when the target snapshot is updated multiple times, the updated date/time 1395 stores data indicating the date/time when the latest update is performed. In the present embodiment, when the target snapshot is never updated, the updated date/time 1395 stores data indicating the generation date/time of the target snapshot.

FIG. 14A illustrates a specific example of a snapshot table 139 at the time point T2 of FIG. 10. For example, the first entry from the top of the drawing indicates that, at the time point T2, the certainty, in the snapshot 1, of the expanded rule 62 (rule 2) including the event 4 as the conclusion event is 66%. The same entry indicates that the snapshot 1 was generated at 9:30:11 on Apr. 20, 2008, and that has never been updated. The second entry from the top of the drawing indicates that, at the time point T2, the certainty, in the snapshot 1, of the expanded rule 62 (rule 1) including the event 3 as the conclusion event is 66%. The same entry also indicates that the snapshot 1 was generated at 9:30:11 on Apr. 20, 2008, and has never been updated.

FIG. 14B illustrates a specific example of the snapshot table 139 at the time point T4 of FIG. 10. For example, the first entry from the top of the drawing indicates that, at the time point T4, the certainty, in the snapshot 1, of the expanded rule 62 (rule 2) including the event 4 as the conclusion event is 100%. This is because the monitor computer 1 detects occurrence of the event 4 at the time point T3 of FIG. 10, and updates the certainty of the rule 2 in the snapshot 1 on the basis thereof. The same entry indicates that the certainty of the rule 2 in the snapshot 1 was updated at 9:41:11 on Apr. 20, 2008. The second entry from the top of the drawing indicates that, at the time point T4, the certainty, in the snapshot 1, of the expanded rule 62 (rule 1) including the event 3 as the conclusion event is 0%. This is because, at the time point T31 of FIG. 10, the monitor computer 1 recognizes that the event 3 has not occurred, and updates the certainty of the rule 1 in the snapshot 1 on the basis thereof. The same entry indicates that the certainty of the rule 1 in the snapshot 1 was updated at 9:46:11 on Apr. 20, 2008.

Figure 15:
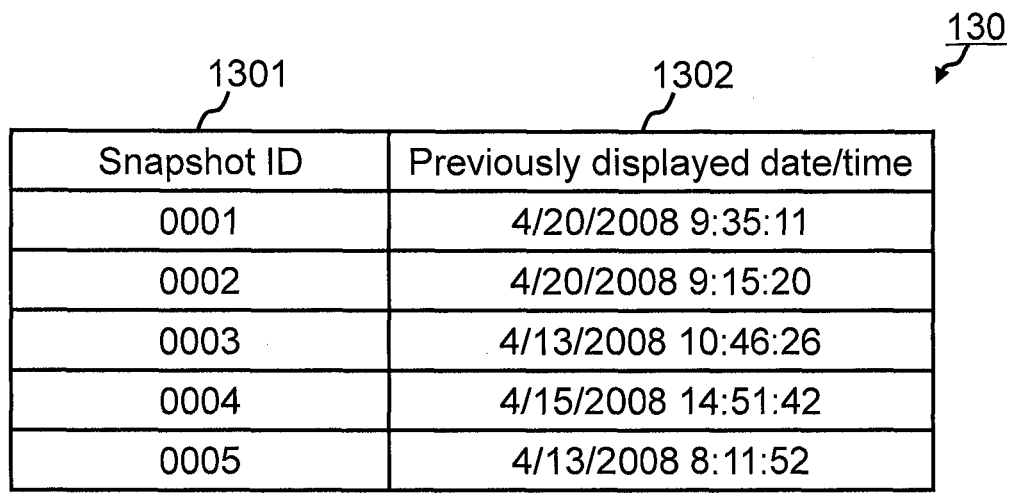
FIG. 15 is a configuration diagram illustrating an example of a snapshot display management table according to the embodiment.

FIG. 15 is a configuration diagram illustrating an example of a snapshot display management table according to the embodiment.

The snapshot display management table 130 is data for managing, for each analysis result snapshot, the previous display date/time of the analysis result snapshot. In this case, the previous display date/time of the analysis result snapshot means the most recent one among the dates/times at which the analysis result indicated by the analysis result snapshot was displayed on a snapshot display screen explained later (see FIG. 23) and was referred to by the administrator. It should be noted that the snapshot display screen is a screen for displaying an analysis result indicated by the analysis result snapshot. The snapshot display management table 130 includes fields of a snapshot ID 1301 and a previous display date/time 1302. The snapshot ID 1301 stores a snapshot ID. The previous display date/time 1302 stores data indicating the date/time of the analysis result snapshot indicated by the snapshot ID 1301 was previously displayed. For example, the first entry from the top of the drawing indicates that the previous display date/time of the snapshot 1 is 9:35:11 on Apr. 20, 2008.

Subsequently, operation of the monitor computer 1 will be described.

Figure 16:
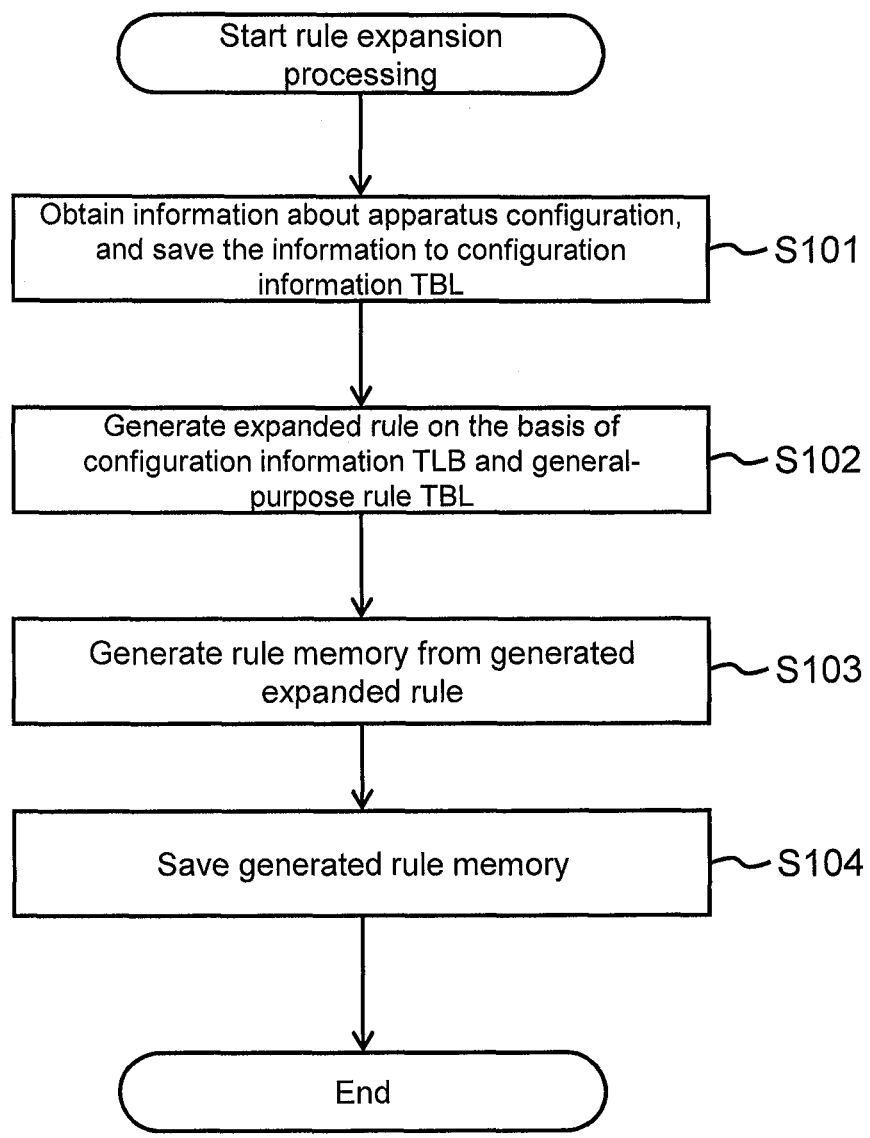
FIG. 16 is a flowchart illustrating rule expansion processing according to the embodiment.

FIG. 16 is a flowchart illustrating rule expansion processing according to the embodiment.

The rule expansion processing is processing for generating rule memory data 8 on the basis of the general rule 61 and the configuration information 131.

First, the rule expansion program 121 obtains various kinds of information constituting the configuration information 131 from the multiple node apparatuses of the computer system, and generates or updates the configuration information 131 on the basis of the obtained information (step S101).

Subsequently, the rule expansion program 121 generates the expanded rule 62 on the basis of the general rule 61 and the configuration information 131 (step S102).

Subsequently, the rule expansion program 121 generates the rule memory data 8 on the basis of the expanded rule 62 generated in step S102 (step S103).

Thereafter, the rule expansion program 121 stores the rule memory data 8 generated in step S103 to the rule memory 128 (step S104). Thereafter, the rule expansion program 121 terminates the rule expansion processing.

Figure 17:
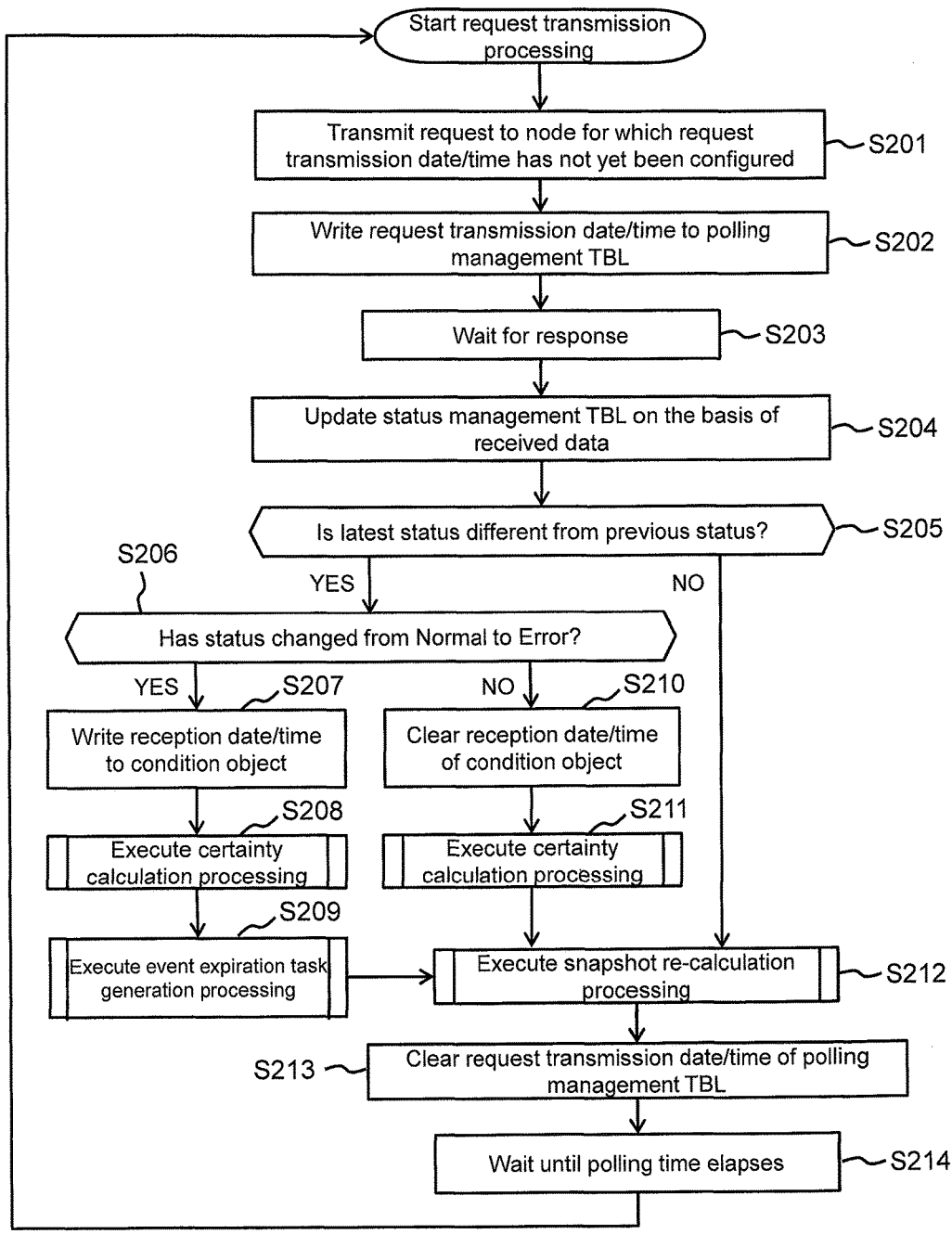
FIG. 17 is a flowchart illustrating request transmission processing according to the embodiment.

FIG. 17 is a flowchart illustrating request transmission processing according to the embodiment.

The request transmission processing is processing in which, a regular interval of time or irregularly, the monitor computer 1 transmits a status request to a monitor target apparatus, and obtains status information about the monitor target apparatus or a component thereof from the monitor target apparatus.

First, the request transmission program 122 transmits the status request to the monitor target apparatus storing "–" in the request transmission date/time 1332 of the polling management table 133. In other words, the monitor target apparatus from which a status response in reply to the status request previously transmitted has already been received (step S201).

Subsequently, the request transmission program 122 stores data indicating the transmission date/time of the status request transmitted in step S201, e.g., data indicating the current date/time, in the request transmission date/time 1332 of the entry concerning the monitor target apparatus to which the status request was transmitted in step S201 in the polling management table 133 (step S202).

Thereafter, the request transmission program 122 waits until the status response is received from the monitor target apparatus (step S203). The request transmission program 122 subsequently performs processing in step S204 when the status response is received from the monitor target apparatus. Hereinafter, the status response received in step S203 will be referred to as "reception response", and the monitor target apparatus that transmitted the reception response will be referred to as "target node apparatus".

In step S204, the request transmission program 122 updates the data of the target in the status management table 134 on the basis of the status information included in the reception response.

More specifically, first, the request transmission program 122 identifies the target node apparatus, the component related to the status indicated by the status information included in the reception response, and the entry of the type of the event corresponding to the fact that the status indicated by the status information included in the reception response is abnormal (hereinafter referred to as "target status entry"). Then, the request transmission program 122 moves or copies the data stored in the latest information collection process start date/time 1340 and the latest status 1348 of the target status entry to the previous information collection process start date/time 134b and the previous status 134a. Thereafter, request transmission program 122 stores the status information included in the reception response to the latest status 1348 of the target status entry, stores the data indicating the date/time when the reception response is received to the event reception date/time 1349 of the latest information collection process of the target status entry, and stores the data indicating the transmission date/time of the status request requesting the reception response to the latest information collection process start date/time 1340 of the target status entry. In this case, the transmission date/time of the status request requesting the reception response is a transmission date/time indicated by the request transmission date/time 1332 of the entry of the target node apparatus in the polling management table 133.

Thereafter, the event detection program 123 determines whether the status indicated by the latest status 1348 of the target status entry (hereinafter referred to as "target latest status") and the status indicated by the previous status 134a of the target status entry (hereinafter referred to as "target previous status") are different from each other (step S205). When the target latest status and the target previous status are different from each other (step S205: YES), the event detection program 123 subsequently performs processing in step S206. On the other hand, when the target latest status and the target previous status are the same (step S205: NO), the event detection program 123 subsequently performs processing in step S212.

In step S206, the event detection program 123 determines whether the status changes from normal to abnormal, and more specifically, the event detection program 123 determines whether the target previous status is normal and the target latest status is abnormal or not.

When the status changes from normal to abnormal, and more specifically, when the target previous status is normal and the target latest status is abnormal (step S206: YES), this means that occurrence of an event of the target node apparatus indicated by the event type 1347 of the target status entry (hereinafter referred to as "target event") has been detected. In this case, the event detection program 123 identifies the condition object 81 corresponding to the target event in the rule memory data 8, and stores data indicating the detection date/time of the target event, e.g., the date/time when the reception response was received, to the Received 816 of the condition object 81 identified (step S207).

Thereafter, the event detection program 123 causes the certainty calculation program 124 to execute the certainty calculation processing (see FIG. 18) (step S208). When the certainty calculation processing is caused to be executed, the event detection program 123 inputs a parameter designating the condition object 81 identified in step S207 into the certainty calculation program 124. In the certainty calculation processing, the certainty is calculated for each conclusion event associated with the target event.

Thereafter, the event detection program 123 causes the event expiration task generation program 126 to execute the event expiration task generation processing (see FIG. 20) (step S209). When the event expiration task generation processing is caused to be executed, the event detection program 123 inputs the parameter designating the condition object 81 identified in step S207 into the event expiration task generation program 126. In the event expiration task generation processing, the event expiration task of the target event is generated. Thereafter, the event detection program 123 subsequently performs processing in step S212.

When the status changes from abnormal to normal in the determination of step S206, and more specifically, when the target previous status is abnormal and the target latest status is normal (step S206: NO), this means that the monitor computer 1 recognizes that the target event has not occurred. In this case, the event detection program 123 identifies the condition object 81 corresponding to the target event in the rule memory data 8, and clears the data stored in the Received 816 of the condition object 81 identified (step S210).

Thereafter, the event detection program 123 causes the certainty calculation program 124 to execute the certainty calculation processing (see FIG. 18) (step S211). When the certainty calculation processing is caused to be executed, the event detection program 123 inputs a parameter designating the condition object 81 identified in step S210 into the certainty calculation program 124. In the certainty calcula- tion processing, the certainty is calculated for each conclusion event associated with the target event. Thereafter, the event detection program 123 subsequently performs processing in step S212.

Figure 19:
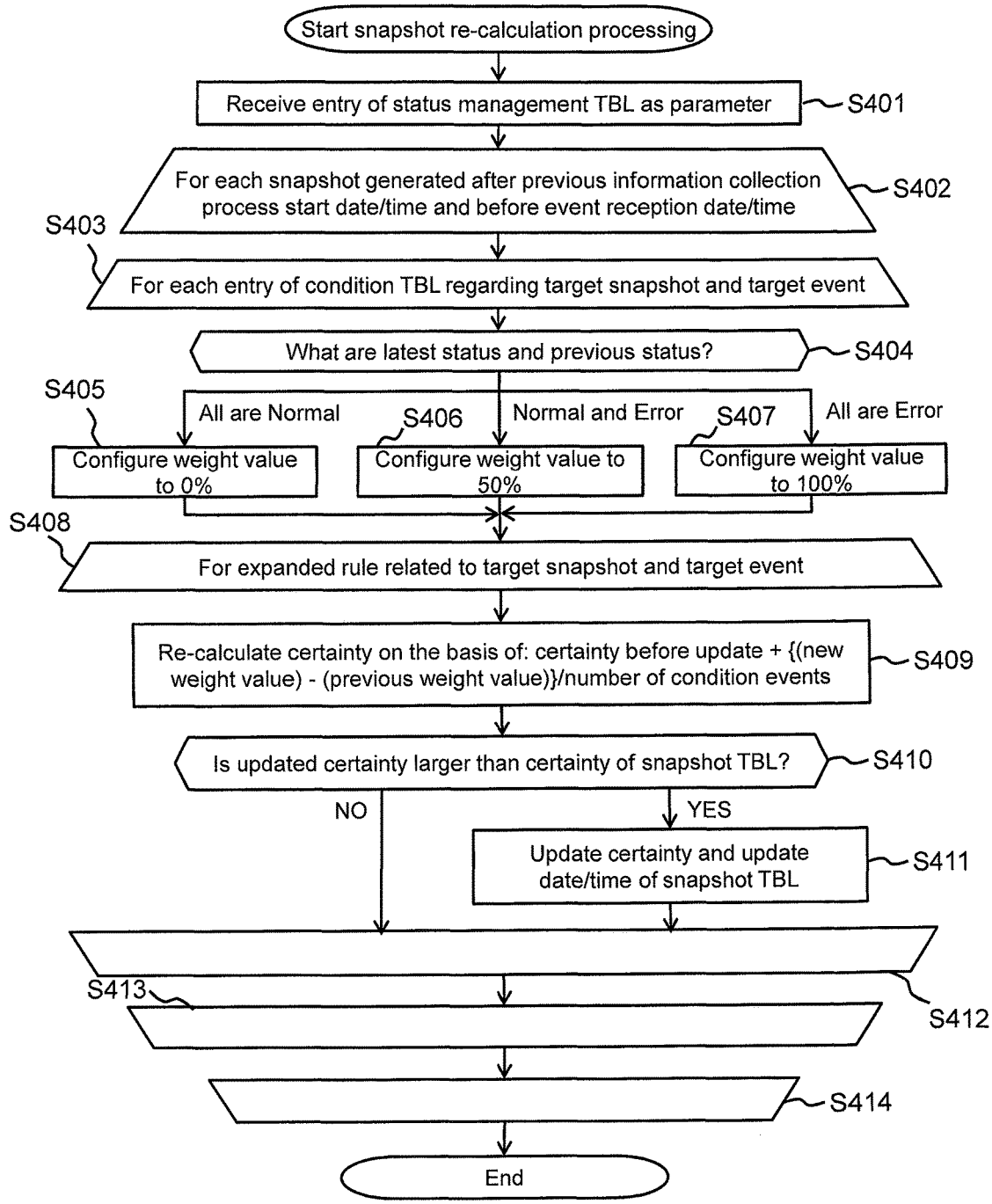
FIG. 19 is a flowchart illustrating snapshot re-calculation processing according to the embodiment.

In step S212, the event detection program 123 causes the snapshot re-calculation program 125 to execute the snapshot re-calculation processing (see FIG. 19). When the snapshot re-calculation processing is caused to be executed, the event detection program 123 inputs a parameter designating the target status entry into the snapshot re-calculation program 125. In the snapshot re-calculation processing, the certainty of the expanded rule 62 including the target event as a condition event or the conclusion event in the certainty indicated by the analysis result snapshot of the update target is re-calculated.

Thereafter, the request transmission program 122 stores data indicating that the status response is received from the target node apparatus, i.e., "–", to the request transmission date/time 1332 of the entry of the target node apparatus in the polling management table 133 (step S213).

Thereafter, the request transmission program 122 waits for a certain period of time (step S214), and after the certain period of time passes, the request transmission processing is performed again.

Figure 18:
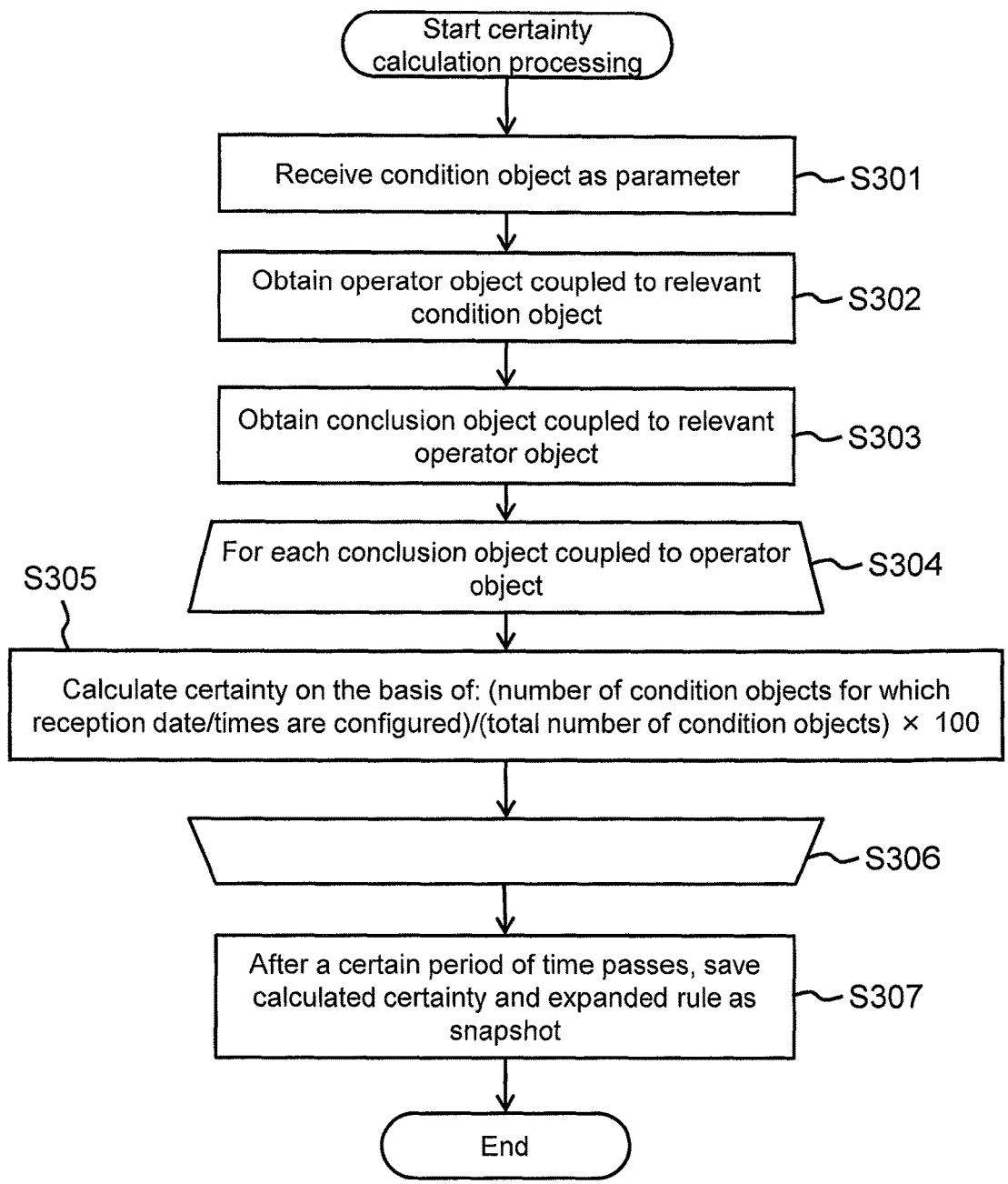
FIG. 18 is a flowchart illustrating certainty calculation processing according to the embodiment.

FIG. 18 is a flowchart illustrating the certainty calculation processing according to the embodiment.

The certainty calculation processing is processing in which on the basis of the rule memory data 8, the certainty of the conclusion event is calculated for each conclusion object 82 coupled to the condition object 81 that has been input. The certainty calculation processing corresponds to processing of step S607 in FIG. 21 or processing of step S211 or step S208 in FIG. 17.

First, the certainty calculation program 124 receives a parameter having been input by the event detection program 123 or the event erase program 127 that has caused the certainty calculation processing to be executed (step S301).

Subsequently, the certainty calculation program 124 obtains, from the rule memory data 8, the operator object 83 coupled to the condition object 81 designated by the parameter having been input (step S302).

Subsequently, the certainty calculation program 124 obtains the conclusion object 82 coupled to the operator object 83 obtained in step S302 from the rule memory data 8 (step S303).

Thereafter, the certainty calculation program 124 performs processing in step S305 on each conclusion object 82 obtained in step S303 (step S304 to S306). In the description of FIG. 18, the conclusion object 82 of the processing target of the conclusion objects 82 obtained in step S303 is referred to as "target conclusion object", and the conclusion event corresponding to the target conclusion object is referred to as "target conclusion event".

In step S305, the certainty calculation program 124 calculates the certainty of the target conclusion event. In the present embodiment, the certainty of the conclusion event is the ratio of the number of condition events associated with the conclusion event and detected by the monitor computer 1 with respect to the total number of condition events associated with the conclusion event. For example, the certainty calculation program 124 divides the number of condition objects 81 which is coupled to the target conclusion object 82 and of which detection date/time is stored in the Received 816 by the total number of condition objects 81 coupled to the target conclusion object 82, and multiplies the value that is obtained by division by 100, thus calculating the certainty of the target conclusion event. Thereafter, the certainty calculation program 124 stores the calculated certainty to the MR 824 of the target conclusion object.

Thereafter, after a certain period of time passes, the certainty calculation program 124 generates an analysis result snapshot at the time point, and saves the generated analysis result snapshot to the storage resource 12 (step S307).

More specifically, for example, the certainty calculation program 124 generates an entry, in the snapshot table 139, of each of the multiple certainties calculated in step S304 to step S306, and adds the generated entries (hereinafter referred to as "generated entries") to the snapshot table 139. For example, the snapshot ID 1391 of the generated entry stores the snapshot ID assigned to the analysis result snapshot generated in step S307 (hereinafter referred to as "generation snapshot"). The root cause 1392 of the generated entry stores data indicating the conclusion event related to the certainty indicated by the entry. The certainty 1393 of the generated entry stores the certainty indicated by the entry. The date/time of snapshot 1394 of the generated entry stores data indicating the generation date/time of the generation snapshot, for example, data indicating the current date/time.

For example, the certainty calculation program 124 generates an entry, in the expanded rule table 138, of the expanded rule 62 of each of the multiple certainties calculated in step S304 to step S306, and adds the generated entries (hereinafter referred to as "generated rule entries") to the expanded rule table 138. For example, the snapshot ID 1381 of the generated rule entry stores the snapshot ID assigned to the generation snapshot. The root cause 1382 of the generated rule entry stores data indicating the conclusion event included in the expanded rule 62 indicated by the entry. The expanded rule 1383 of the generated rule entry stores the name of the expanded rule 62 indicated by the entry. The number of condition events 1384 of the generated rule entry stores the total number of condition events included in the expanded rule 62 indicated by the entry. The certainty 1385 of the generated rule entry stores the certainty, calculated in step S305, concerning the expanded rule 62 indicated by the entry.

For example, the certainty calculation program 124 generates an entry, in the condition table 137, of each condition event included in the expanded rule 62 indicated by the generated rule entry, and adds the generated entries (hereinafter referred to as "generated condition entries") to the condition table 137. For example, the snapshot ID 1371 of the generated condition entry stores the snapshot ID assigned to the generation snapshot. The root cause 1372 of the generated condition entry stores data indicating the conclusion event included in the expanded rule 62 indicated by the generated rule entry. The expanded rule 1373 of the generated condition entry stores the name of the expanded rule 62 indicated by the generated rule entry. The status management ID 1374 of the generated condition entry stores data indicating the condition event indicated by the generated condition entry. The weight 1376 of the generated condition entry stores the weight value that is configured for the condition event indicated by the generated condition entry. For example, in a case where the monitor computer 1 already receives the status response indicating the status corresponding to the condition event indicated by the generated condition entry, and the status response indicates normal status, then the weight 1376 of the generated condition entry stores 0 [%]. When the monitor computer 1 has already received the status response indicating the status corresponding to the condition event indicated by the generated condition entry, and the status response indicates abnormal status, the weight 1376 of the generated condition entry stores 100 [%]. On the other hand, when the monitor computer 1 has not yet received the status response indicating the status corresponding to the condition event indicated by the generated condition entry, the weight 1376 of the generated condition entry stores data indicating the weight value has not yet been configured, for example "–".

Thereafter, the certainty calculation program 124 terminates the certainty calculation processing.

In the present embodiment, the monitor computer 1 calculates a certainty in the certainty calculation processing, and thereafter, generates an analysis result snapshot. More specifically, every time the monitor computer 1 recognizes that the status indicated by the reception response has been changed from the previous status in the request transmission processing, and every time the detection of the event is invalidated in the event erase processing, the monitor computer 1 generates an analysis result snapshot. However, the timing with which the analysis result snapshot is generated is not limited to the timing shown in FIG. 18. As described above, the analysis result snapshot may be generated after a certain period of time passes since the event is received, or the timing with which the analysis result snapshot is generated may be determined on the basis of the transmission cycle of the status request in the request transmission processing. In a case where the analysis result snapshot is generated after the certainty is calculated in the certainty calculation processing, for example, the monitor computer 1 may generate the analysis result snapshot only once in the certainty calculation processing performed multiple times.

FIG. 19 is a flowchart illustrating the snapshot re-calculation processing according to the embodiment.

The snapshot re-calculation processing is processing for re-calculating the certainty indicated by the analysis result snapshot of the update target on the basis of the received status response. The snapshot re-calculation processing corresponds to processing in step S212 in FIG. 17.

First, the snapshot re-calculation program 125 receives a parameter having been input according to the event detection program 123 that has caused the snapshot re-calculation processing to be executed. More specifically, the snapshot re-calculation program 125 receives a parameter designating the target status entry (step S401).

The snapshot re-calculation program 125 performs processing in step S402 to step S414 on each analysis result snapshot of the update target. In this case, the analysis result snapshot of the update target is an analysis result snapshot that is generated after the date/time indicated by the previous information collection process start date/time 134b of the target status entry, i.e., the transmission date/time of the previous status request to the target node apparatus but before the date/time indicated by the event reception date/time 1349 in the latest information collection process of the target status entry, i.e., the reception date/time of the reception response (most recent status response) from the target node apparatus. In the description of FIG. 19, the analysis result snapshot of the processing target among the analysis result snapshots of the update targets is referred to as "target snapshot".

The snapshot re-calculation program 125 performs processing in step S403 to step S413 on each entry concerning the target event and the target snapshot in the condition table 137. In the description of FIG. 19, the entry of the processing target of the entries concerning the target event and the target snapshot in the condition table 137 is referred to as "target condition entries".

In step S404, the snapshot re-calculation program 125 copies the weight value stored in the weights 1376 of the target condition entry (hereinafter referred to as "earlier weight value") to a predetermined portion of the storage resource 12. Then, the snapshot re-calculation program 125 checks the target latest status and the target previous status.

In a case where both of the target latest status and the target previous status are normal (step S404: all Normal), the snapshot re-calculation program 125 stores 0 [%] to the weight 1376 of the target condition entry (step S405). More specifically, in a case where the status indicated by the reception response has not yet been changed from the status indicated by the previous status response and remains normal, the snapshot re-calculation program 125 configures the target event of the analysis result snapshot of the update target to a weight value 0% indicating that the target event has not occurred.

On the other hand, when both of the target latest status and the target previous status are abnormal (step S404: all Error), the snapshot re-calculation program 125 stores 100 [%] to the weight 1376 of the target condition entry (step S407). More specifically, in a case where the status indicated by the reception response has not yet been changed from the status indicated by the previous status response and remains abnormal, the snapshot re-calculation program 125 configures the target event of the analysis result snapshot of the update target to a weight value 100% indicating that the target event has occurred.

On the other hand, when any one of the target latest status and the target previous status is normal and the other of the target latest status and the target previous status is abnormal (step S404: Normal and Error), the snapshot re-calculation program 125 stores 50 [%] to the weight 1376 of the target condition entry (step S406). More specifically, in a case where the status indicated by the reception response has been changed from the status indicated by the previous status response, the snapshot re-calculation program 125 configures the target event of the analysis result snapshot of the update target to a weight value 50%.

Thereafter, the snapshot re-calculation program 125 performs processing in step S408 to step S412 on the expanded rule 62 indicated by the expanded rule 1373 of the target condition entry (hereinafter referred to as "target expanded rule"). In this case, the target expanded rule means the expanded rule including the condition event for which the weight value has been configured in step S405, step S406, or step S407, of the expanded rules 62 related to the target snapshot.

In step S409, the snapshot re-calculation program 125 re-calculates the certainty of the target expanded rule, and stores the certainty obtained from the re-calculation (hereinafter referred to as "updated certainty") to the certainty 1385 of the entry of the target expanded rule in the expanded rule table 138.

For example, the snapshot re-calculation program 125 re-calculates the certainty as follows. More specifically, first, the snapshot re-calculation program 125 obtains the certainty before the re-calculation concerning the target expanded rule (hereinafter referred to as "prior-to-update certainty") from the certainty 1385 of the entry of the target expanded rule in the expanded rule table 138. The snapshot re-calculation program 125 obtains the total number of condition events included in the target expanded rule from the number of condition events 1384 in the entry of the target expanded rule in the expanded rule table 138. The snapshot re-calculation program 125 obtains the weight value that is configured for the target event in step S405, step S406, or step S407 (hereinafter referred to as "new weight value") from the weights 1376 of the target condition entry. Then, the snapshot re-calculation program 125 subtracts the earlier weight value from the new weight value, divides the value obtained from the subtraction by the total number of condition events included in the target expanded rule, and adds the value obtained from the division to the prior-to-update certainty, thus obtaining the updated certainty. The snapshot re-calculation program 125 may perform calculation performed in step S305 of the certainty calculation processing (FIG. 18) again, and more specifically, may re-calculate the ratio of the number of condition events detected by the monitor computer 1 with respect to the total number of condition events, thus obtaining the updated certainty.

Thereafter, the snapshot re-calculation program 125 determines whether the updated certainty is higher than the certainty stored in the certainty 1393 of the entry of the target expanded rule and the target snapshot in the snapshot table 139 (hereinafter referred to as "target snapshot entry") (step S410).

When the updated certainty is more than the certainty stored in the certainty 1393 of the target snapshot entry (step S410: YES), the snapshot re-calculation program 125 stores the updated certainty to the certainty 1393 of the target snapshot entry, and stores the updated date/time of the target snapshot to the updated date/time 1395 of the target snapshot entry, and more specifically, stores data indicating the current date/time thereto (step S411). On the other hand, when the updated certainty is not more than the certainty stored in the certainty 1393 of the target snapshot entry (step S410: NO), the snapshot re-calculation program 125 subsequently performs processing in step S412.

When the snapshot re-calculation program 125 has finished performing the processing in step S403 to step S413 on each entry of the target event and the target snapshot in the condition table 137, and has finished performing the processing in step S402 to step S414 on each analysis result snapshot of the update target, then the snapshot re-calculation processing is terminated.

Figure 20:
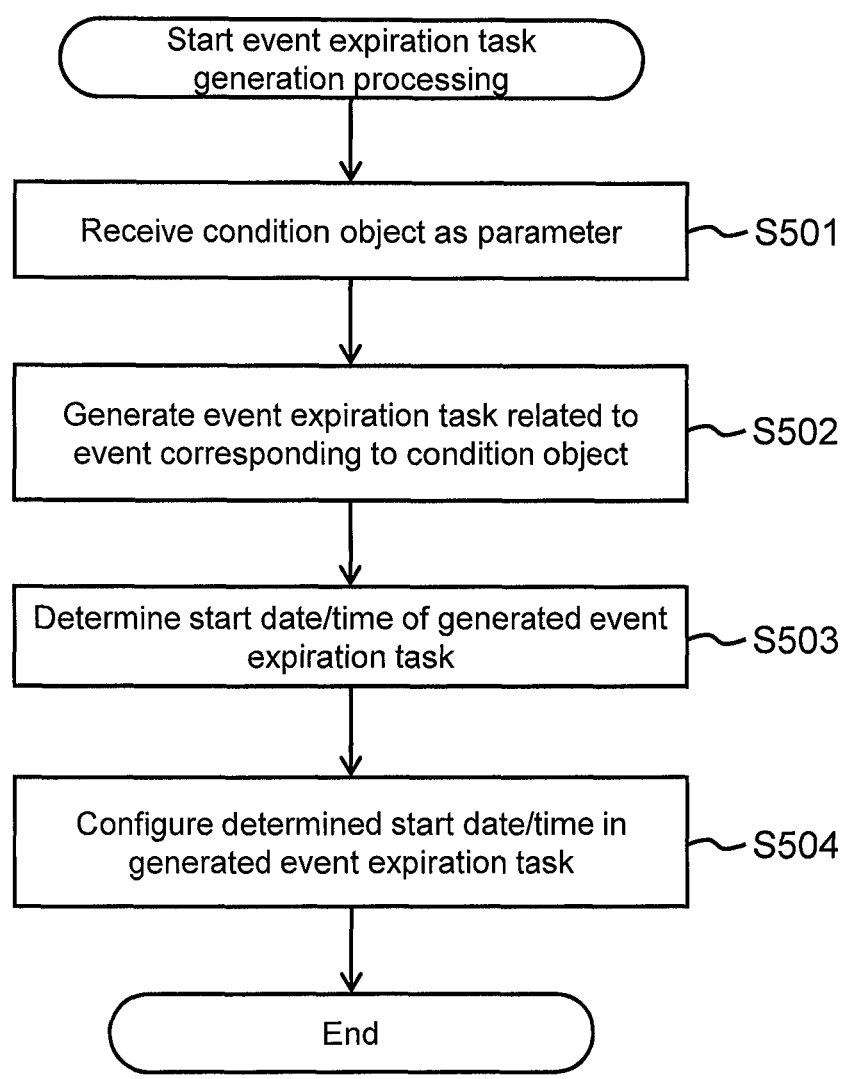
FIG. 20 is a flowchart illustrating event expiration task generation processing according to the embodiment.

FIG. 20 is a flowchart illustrating the event expiration task generation processing according to the embodiment.

The event expiration task generation processing is processing for generating the event expiration task of the condition event corresponding to the condition object 81 that is input.

First, the event expiration task generation program 126 receives a parameter having been input by the event detection program 123 that has caused the event expiration task generation processing to be executed (step S501).

Subsequently, the event expiration task generation program 126 generates the event expiration task of the condition event corresponding to the condition object 81 designated by the parameter received in step S501 (more specifically, target event) (step S502). More specifically, the event expiration task generation program 126 generates an entry of the target event in the event expiration task table 136, and adds the generated entry to the event expiration task table 136. The name of the target node apparatus is stored to the node name 1362 of the generated entry. The data indicating the type of the target event is stored to the event type 1363 of the generated entry.

Subsequently, the event expiration task generation program 126 determines the task start date/time of the event expiration task generated in step S502 (step S503). More specifically, the event expiration task generation program 126 obtains the valid period that is configured for the target event from the event valid period configuring table 135. Then, the event expiration task generation program 126 determines that the date/time obtained by adding the valid period that is configured for the target event to the detection date/time of the target event is the task start date/time of the generated event expiration task.

Thereafter, the event expiration task generation program 126 stores the data indicating the task start date/time determined in step S503 to the start date/time 1361 of the entry added in step S502 (step S504). Thereafter, the event expiration task generation program 126 terminates the event expiration task generation processing.

Figure 21:
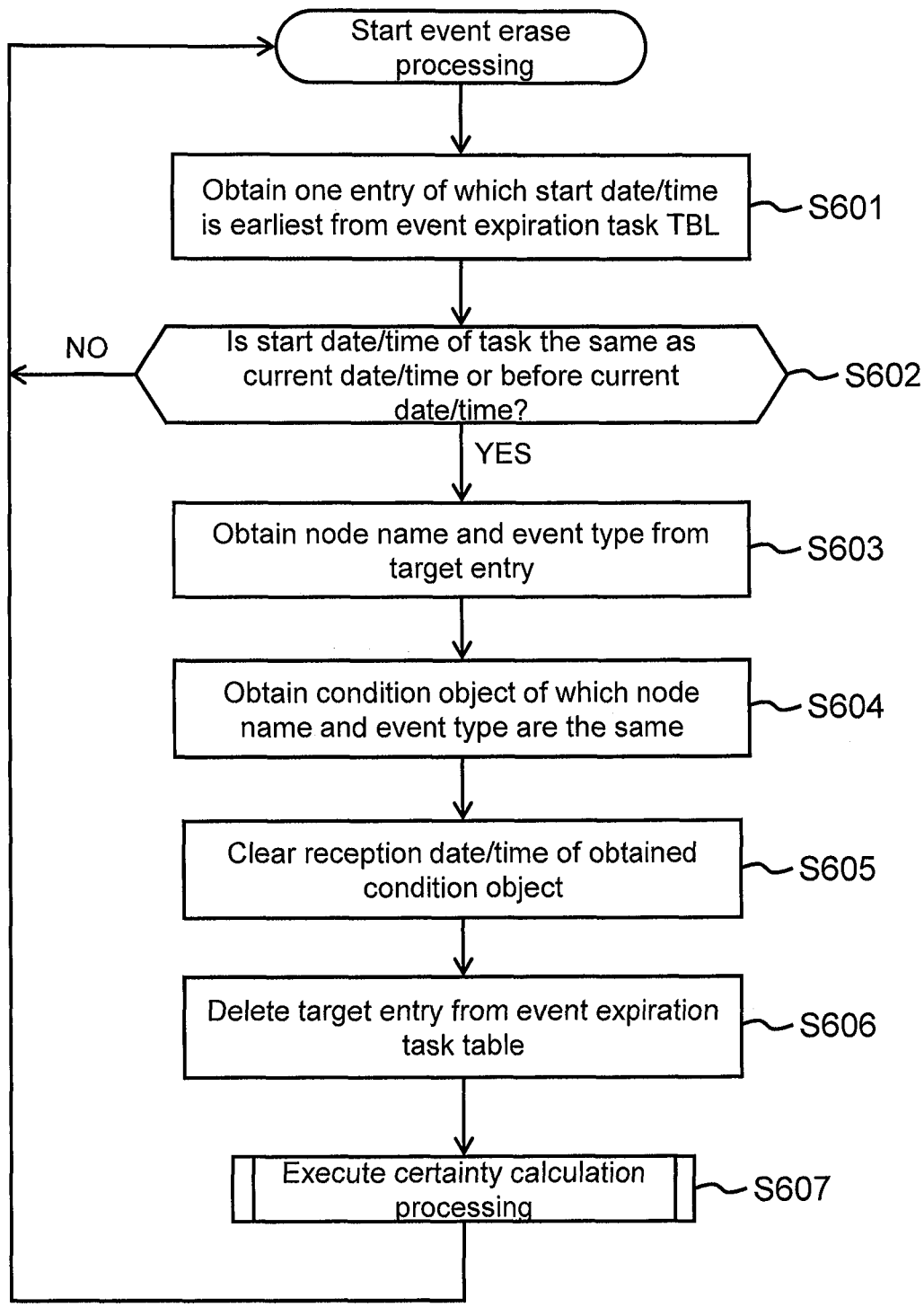
FIG. 21 is a flowchart illustrating event erase processing according to the embodiment.

FIG. 21 is a flowchart illustrating the event erase processing according to the embodiment.

The event erase processing is processing for invalidating the detection of the event of which valid period has elapsed.

First, the event erase program 127 obtains, from the event expiration task table 136, an entry of which date/time stored in the start date/time 1361 is the earliest (step S601). In the description of FIG. 21, the obtained entry is referred to as "target entry", and the event expiration task corresponding to the target entry, i.e., the event expiration task managing information by the target entry is referred to as "target event expiration task".

Subsequently, the event erase program 127 determines whether the date/time indicated by the start date/time 1361 of the target entry, i.e., the task start date/time of the target event expiration task, is the same as the current date/time or before the current date/time (step S602). When the task start date/time of the target event expiration task is after the current date/time (step S602: NO), the event erase program 127 waits for a certain period of time, and thereafter, performs the event erase processing again.

On the other hand, when the task start date/time of the target event expiration task is the same as the current date/time, or before the current date/time (step S602: YES), the event erase program 127 obtains, from the node name 1362 and the event type 1363 of the target entry, data indicating the name of the node apparatus and the type of the invalid event related to the event which is the target of the target event expiration task (hereinafter referred to as "invalid event") (step S603).

Subsequently, the event erase program 127 obtains, from the rule memory data 8, the condition object 81 corresponding to the invalid event ("target condition object" in the description of FIG. 21) (step S604). More specifically, the event erase program 127 searches the rule memory data 8 using the name of the node apparatus and the type of the invalid event as keys related to the invalid event, and identifies, as the target condition object, the condition object 81 where the name of the node apparatus and the type of the event indicated by the NodeName 812 and the Event 815 are the same as the keys.

Thereafter, the event erase program 127 clears the data stored in the Received 816 of the target condition object (step S605).

Thereafter, the event erase program 127 deletes the target entry from the event expiration task table 136 (step S606).

Thereafter, the event erase program 127 causes the certainty calculation program 124 to execute the certainty calculation processing (see FIG. 18) (step S607). When the certainty calculation processing is caused to be executed, the event erase program 127 inputs the parameter designating the target condition object into the certainty calculation program 124. In the certainty calculation processing, the certainty is calculated for each conclusion event associated with the invalid event. Thereafter, the event erase program 127 waits for a certain period of time, and thereafter performs the event erase processing again.

Figure 22:
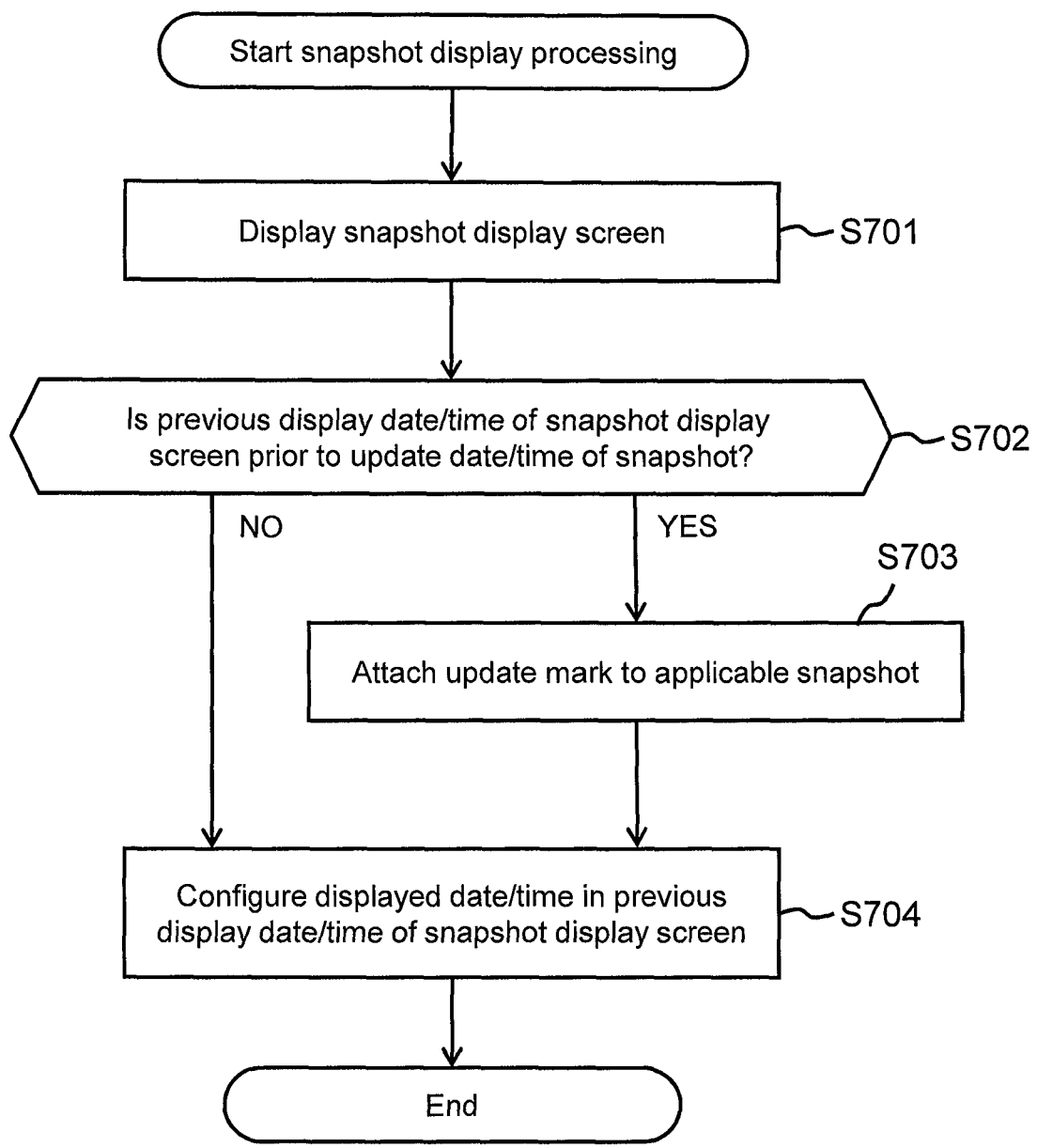
FIG. 22 is a flowchart illustrating snapshot display processing according to the embodiment.

FIG. 22 is a flowchart illustrating the snapshot display processing according to the embodiment.

The snapshot display processing is processing for displaying the snapshot display screen (see FIG. 23) on the basis of the indication given by the administrator.

When the monitor computer 1 receives the indication for displaying the snapshot display screen from the administrator, the monitor computer 1 generates the snapshot display screen including the analysis result indicated by the analysis result snapshot managed in the table 139 on the basis of the snapshot table 139, and displays the generated screen on the display 17 (step S701).

Thereafter, the monitor computer 1 performs processing in step S702 to step S703 on each analysis result snapshot managed in the snapshot table 139. In the description of FIG. 22, the analysis result snapshot of the processing target will referred to as "target snapshot".

In step S702, the monitor computer 1 determines whether the previous display date/time of the target snapshot is before the updated date/time of the target snapshot. In this case, the previous display date/time of the target snapshot is the date/time stored in the previous display date/time 1302 of the entry of the target snapshot in the snapshot display management table 130. The updated date/time of the target snapshot is the date/time stored in the updated date/time 1395 of the entry of the target snapshot in the snapshot table 139. When there are multiple entries of the target snapshot in the snapshot table 139, and more specifically, when there are multiple expanded rules 62 related to the target snapshot, for example, the latest date/time of dates/times stored in the updated date/time 1395 of the multiple entries is the updated date/time of the target snapshot.

When the previous display date/time of the target snapshot is before the updated date/time of the target snapshot (step S702: YES), the monitor computer 1 displays, on the snapshot display screen displayed in step S701, a mark indicating that the analysis result indicated by the target snapshot is updated after it is referred to by the administrator (hereinafter referred to as "update mark") (step S703). When the previous display date/time of the target snapshot is not before the updated date/time of the target snapshot (step S702: NO), the monitor computer 1 does not execute the processing in step S703.

After the processing in step S702 to step S703 has been performed on each analysis result snapshot managed in the snapshot table 139, the monitor computer 1 subsequently performs processing in step S704.

In step S704, the monitor computer 1 determines which analysis result indicated by the analysis result snapshot the administrator refers to on the snapshot display screen. Then, the monitor computer 1 stores the data indicating the current date/time to the previous display date/time 1302 of the entry of the analysis result snapshot indicated by the analysis result referred to by the administrator in the snapshot display management table 130. When the monitor computer 1 receives, from the administrator, the indication of terminating the display of the snapshot display screen, the monitor computer 1 terminates the snapshot display processing.

FIG. 23 is a configuration diagram illustrating an example of a snapshot display screen according to the embodiment.

The snapshot display screen 9 is a screen for displaying the analysis result indicated by the analysis result snapshot. The snapshot display screen 9 is generated on the basis of the snapshot table 139. The snapshot display screen 9 includes data for identifying each analysis result snapshot managed in the snapshot table 139, for example, an area 91 for displaying the generation date/time of the analysis result snapshot, and an area 92 for displaying detailed information about the analysis result snapshot selected by the administrator from among the analysis result snapshots displayed in the area 91 (analysis result and the like).

An update mark 93 is displayed at the analysis result snapshot indicating the analysis result which the administrator has not yet referred to, i.e., the analysis result that is updated after the administrator refers to the analysis result, in the area 91. The area 92 includes, for example, data indicating one or more certainties indicated by the selected analysis result snapshot and the conclusion event related to each certainty, and, for example, data indicating the name of the node apparatus related to the conclusion event and the type of the conclusion event.

The administrator can easily find the analysis result snapshot that was updated from previous reference to the present moment by looking up the update mark 93 in the snapshot display screen 9. The administrator can refer to the snapshot display screen 9, and can refer to not only the certainty obtained from the certainty calculation processing but also the certainty indicated by the analysis result snapshot that can be updated to more accurate certainty on the basis of the status information received after the generation, thus capable of identifying the cause more accurately.

It should be noted that the present invention is not limited to the embodiment described above, and it is to be understood that the present invention can be changed in various manners without deviating from the gist.

REFERENCE SIGNS LIST

1: monitor computer
2: server
3: storage
4: network apparatus

The invention claimed is:
1. A monitor system comprising:
a communication interface device coupled to a plurality of node apparatuses; and
a control device coupled to the communication interface device,
wherein the control device is configured to:
(A) transmit, to each of the plurality of node apparatuses, a request for requesting event occurrence information indicating whether an event has occurred in the node apparatus, and detect an occurrence of an event concerning the node apparatus on the basis of the event occurrence information included in a response in reply to the request;
(B) for each conclusion of a plurality of rules indicating a correspondence relationship between one or more condition events corresponding to one or more events related to any one of the plurality of node apparatuses and a conclusion which, indicates a cause in a case where the one or more condition events occur, calculate an index value indicating a certainty that the conclusion is the cause on the basis of a presence or an absence of a detection of an occurrence of one or more events corresponding to the one or more condition events related with the conclusion;
(C) generate, at a predetermined time point, an analysis result snapshot indicating the index value at the predetermined time point, associate the analysis result snapshot with a generation time of the analysis result snapshot, and manage the analysis result snapshot and the generation time; and (D) when receiving a first response in reply to a first request transmitted to a first node apparatus which is any one of the plurality of node apparatuses, update the index value indicated by the analysis result snapshot generated in an update target period that includes a period from a transmission time of the first request to a reception time of the first response, on the basis of the event occurrence information included in the first response.

2. The monitor system according to claim 1,
wherein the control device is configured to display the index value indicated by the analysis result snapshot and a conclusion related to the index value.

3. The monitor system according to claim 2,
wherein the control device is configured to update, in (D), the index value indicated by the analysis result snapshot generated in the update target period, regarding the update target period as a period from a transmission time of a second request transmitted to the first node apparatus before the first request to the reception time of the first response.

4. The monitor system according to claim 3,
wherein the control device is configured to update, in (D), an index value of a conclusion associated with the condition event of the first node apparatus among the index values indicated by the analysis result snapshot generated in the update target period to a value based on whether the condition event of the first node apparatus has occurred or not, when the event occurrence information included in the first response and the event occurrence information included in the second response in reply to the second request indicate different contents.

5. The monitor system according to claim 4,
wherein the control device is configured to associate the analysis result snapshot with an updated time of the analysis result snapshot and manage the analysis result snapshot and the updated time in a case where the index value indicated by the analysis result snapshot is updated,
wherein the control device is configured to associate the analysis result snapshot with a display time of the analysis result snapshot and manage the analysis result snapshot and the display time in a case where the index value indicated by the analysis result snapshot is displayed, and
wherein the control device is configured to further display data indicating that the index value indicated by the analysis result snapshot has been updated after the analysis result snapshot was previously displayed in a case where the index value indicated by the analysis result snapshot is displayed, and where the updated time associated with the analysis result snapshot is after the display time.

6. The monitor system according to claim 5,
wherein a valid period is configured for an event of any one of the plurality of node apparatuses, and
wherein the control device is configured to, in a case where occurrence of a first event of any one of the plurality of node apparatuses is detected, in (B), calculate the index value with detection of the first event treated as being valid from when the first event is detected to when the valid period that is configured for the first event elapses, and calculate the index value with the detection of the first event treated as being invalid after the valid period that is configured for the first event has elapsed since the first event is detected.

7. The monitor system according to claim 6,
wherein the control device is configured to, in (A), transmit the request to each of the plurality of node apparatuses with a regular interval of time or irregularly in a repeated manner, and not to transmit the request to a node apparatus of which response in reply to the request previously transmitted has not been received by the monitor system at a time point when the request is transmitted.

8. A non-transitory computer-readable medium storing a monitor program executed by a computer coupled to a plurality of node apparatuses, causing the computer to:

(A) transmit, to each of the plurality of node apparatuses, a request for requesting event occurrence information indicating whether an event has occurred in the node apparatus, and detect an occurrence of an event concerning the node apparatus on the basis of the event occurrence information included in a response in reply to the request;

(B) for each conclusion of a plurality of rules indicating a correspondence relationship between one or more condition events corresponding to one or more events related to any one of the plurality of node apparatuses and a conclusion, which indicates a cause in a case where the one or more condition events occur, calculate an index value indicating a certainty that the conclusion is the cause on the basis of a presence or an absence of a detection of one or more events corresponding to the one or more condition events related with the conclusion;

(C) generate, at a predetermined time point, an analysis result snapshot indicating the index value at the predetermined time point, associate the analysis result snapshot with a generation time of the analysis result snapshot, and manage the analysis result snapshot and the generation time, and (D) when receiving a first response in reply to a first request transmitted to a first node apparatus which is any one of the plurality of node apparatuses, update the index value indicated by the analysis result snapshot generated in an update target period that includes a transmission time of the first request to a reception time of the first response, on the basis of the event occurrence information included in the first response.

9. The monitor program according to claim 8, causing the computer to display the index value indicated by the analysis result snapshot and a conclusion related to the index value.

10. The monitor program according to claim 8, causing the computer to update, in (D), the index value indicated by the analysis result snapshot generated in the update target period, regarding the update target period as a period from a transmission time of a second request transmitted to the first node apparatus before the first request to the reception time of the first response.

11. The monitor program according to claim 10, causing the computer to update, in (D), an index value of a conclusion associated with the condition event of the first node apparatus among the index values indicated by the analysis result snapshot generated in the update target period to a value based on whether the condition event of the first node apparatus has occurred or not, when the event occurrence information included in the first response and the event occurrence information included in the second response in reply to the second request indicate different contents.

12. The monitor program according to claim 9, causing the computer to associate the analysis result snapshot with an updated time of the analysis result snapshot and manage the analysis result snapshot and the updated time in a case where the index value indicated by the analysis result snapshot is updated, associate the analysis result snapshot with a display time of the analysis result snapshot and manage the analysis result snapshot and the display time in a case where the index value indicated by the analysis result snapshot is displayed, and further display data indicating that the index value indicated by the analysis result snapshot has been updated after the analysis result snapshot was previously displayed in a case where the index value indicated by the analysis result snapshot is displayed, and where the updated time associated with the analysis result snapshot is after the display time.

13. The monitor program according to claim 8, wherein a valid period is configured for an event of any one of the plurality of node apparatuses, and the monitoring program causing the computer to, in a case where occurrence of a first event of any one of the plurality of node apparatuses is detected, in (B), calculate the index value with detection of the first event treated as being valid from when the first event is detected to when the valid period that is configured for the first event elapses, and calculate the index value with the detection of the first event treated as being invalid after the valid period that is configured for the first event has elapsed since the first event is detected.

14. The monitor program according to claim 8, causing the computer to, in (A), transmit the request to each of the plurality of node apparatuses with a regular interval of time or irregularly in a repeated manner, and not to transmit the request to a node apparatus of which response in reply to the request previously transmitted has not been received by the monitor system at a time point when the request is transmitted.

15. The monitor program according to claim 8, causing the computer to update, in (D), the index value indicated by the analysis result snapshot generated in the update target period to a value determined in view of the detection of the condition event of the first node apparatus, when the event occurrence information included in the first response indicates that an event of the first node apparatus has occurred.

* * * * *